(12) United States Patent
Thillaiyan et al.

(10) Patent No.: US 11,050,284 B2
(45) Date of Patent: Jun. 29, 2021

(54) ELECTROLYTE, A BATTERY INCLUDING THE SAME, AND METHODS OF REDUCING ELECTROLYTE FLAMMABILITY

(71) Applicant: EAGLEPICHER TECHNOLOGIES, LLC, Joplin, MO (US)

(72) Inventors: Ramanathan Thillaiyan, Joplin, MO (US); Wujun Fu, Joplin, MO (US); Mario Destephen, Joplin, MO (US); Gregory Lee Miller, Diamond, MO (US); Eivind Listerud, Osceola, MO (US); Eric Lloyd Quee, Seneca, MO (US)

(73) Assignee: EAGLEPICHER TECHNOLOGIES, LLC, Joplin, MO (US)

( * ) Notice: Subject to any disclaimer, the term of this patent is extended or adjusted under 35 U.S.C. 154(b) by 320 days.

(21) Appl. No.: 14/730,590

(22) Filed: Jun. 4, 2015

(65) Prior Publication Data

US 2016/0336615 A1    Nov. 17, 2016

Related U.S. Application Data

(63) Continuation-in-part of application No. 14/708,377, filed on May 11, 2015, now abandoned.

(51) Int. Cl.
| | |
|---|---|
| *H02J 7/00* | (2006.01) |
| *H01M 10/42* | (2006.01) |
| *H01M 10/0567* | (2010.01) |
| *H01M 4/587* | (2010.01) |
| *H01M 10/44* | (2006.01) |

(Continued)

(52) U.S. Cl.
CPC ............. *H02J 7/007* (2013.01); *H01M 4/382* (2013.01); *H01M 4/386* (2013.01); *H01M 4/405* (2013.01); *H01M 4/587* (2013.01); *H01M 4/625* (2013.01); *H01M 10/052* (2013.01); *H01M 10/0567* (2013.01); *H01M 10/4235* (2013.01);

(Continued)

(58) Field of Classification Search
None
See application file for complete search history.

(56) References Cited

U.S. PATENT DOCUMENTS

2001/0010877 A1    8/2001  Arai et al.
2003/0108801 A1    6/2003  Otsuki et al.

(Continued)

FOREIGN PATENT DOCUMENTS

JP       2002083628 A  *  3/2002

OTHER PUBLICATIONS

International Search Report dated Aug. 16, 2016; International Application No. PCT/US15/64948; International Filing Date Dec. 10, 2015 (2 pgs).

(Continued)

*Primary Examiner* — Daniel S Gatewood
(74) *Attorney, Agent, or Firm* — Cantor Colburn LLP

(57) ABSTRACT

An improved electrolyte including a fire-retardant additive suitable for application in wide temperature cell and/or battery operation with safer cell design, a battery including the electrolyte and a separator optionally containing a fire-retardant additive, improved electrical and thermal conductive electrodes are disclosed. The presence of the fire-retardant additive reduces flammability of the electrolyte and improved the overall safety of the battery.

14 Claims, 11 Drawing Sheets

(51) Int. Cl.
H01M 10/052 (2010.01)
H01M 4/62 (2006.01)
H01M 4/40 (2006.01)
H01M 4/38 (2006.01)
H01M 10/0569 (2010.01)

(52) U.S. Cl.
CPC ...... *H01M 10/446* (2013.01); *H01M 10/0569* (2013.01); *H01M 2300/0025* (2013.01)

(56) References Cited

U.S. PATENT DOCUMENTS

| | | | | |
|---|---|---|---|---|
| 2003/0157413 A1* | 8/2003 | Chen | ............... | H01M 10/052 |
| | | | | 429/326 |
| 2006/0073381 A1* | 4/2006 | Kanno | ............... | H01M 2/16 |
| | | | | 429/142 |
| 2010/0047695 A1 | 2/2010 | Smart et al. | | |
| 2011/0159329 A1* | 6/2011 | Tsujikawa | ......... | H01M 10/0525 |
| | | | | 429/94 |
| 2013/0252090 A1* | 9/2013 | Tsujikawa | ......... | H01M 10/4235 |
| | | | | 429/211 |
| 2014/0127536 A1* | 5/2014 | Kaiser | ............... | H01M 2/162 |
| | | | | 429/50 |
| 2014/0342249 A1 | 11/2014 | He et al. | | |

OTHER PUBLICATIONS

Written Opinion dated Aug. 16, 2016; International Application No. PCT/US15/64948; International Filing Date Dec. 10, 2015 (7 pgs).

* cited by examiner

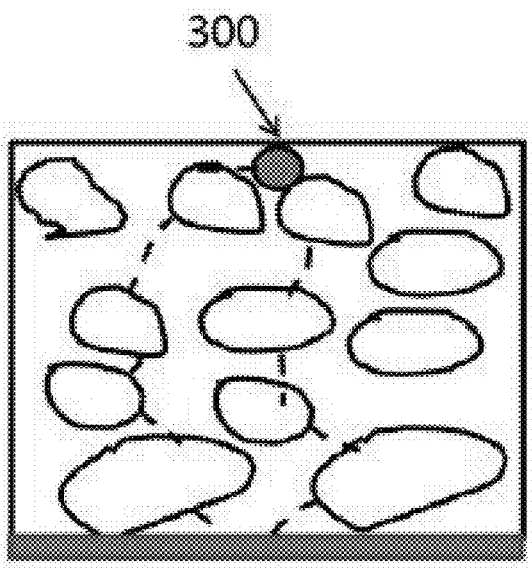 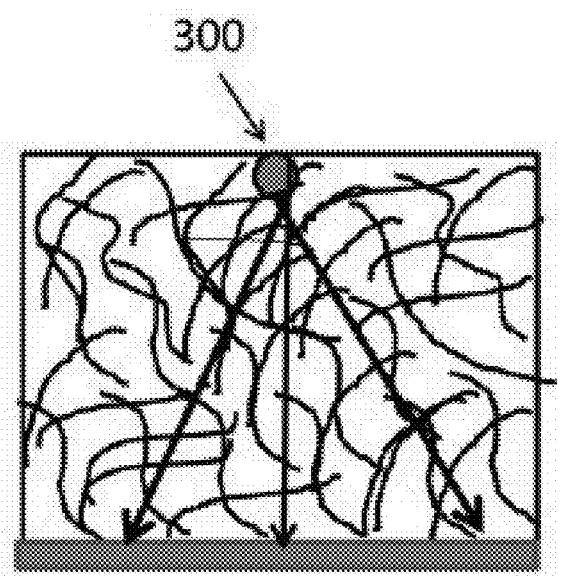
FIG. 20A                     FIG. 20B

ELECTROLYTE, A BATTERY INCLUDING THE SAME, AND METHODS OF REDUCING ELECTROLYTE FLAMMABILITY

GOVERNMENT SUPPORT

This invention was made with Government support awarded by NAVAIR under Contract N68335-11-C-0464. The government has certain rights in this application.

TECHNICAL FIELD

Embodiments of the invention generally relate to battery technology. More particularly, the disclosure relates to lithium batteries including fire-retardant additives, and to methods of forming and using the batteries with improved safety.

BACKGROUND

As lighter and smaller portable electronic devices with increasing functionality continue to be developed, there is generally a correspondingly increasing demand for smaller, lighter batteries with increased energy density to power the devices. Such batteries can be used in commercial applications, such as portable notebooks and computers, digital and cellular phones, personal digital assistants, and the like, and higher energy applications, such as hybrid and electric cars, and military or defense applications.

Lithium batteries have been developed to address some of these concerns. Lithium batteries generally have an anode of lithium metal or its alloy or graphite or carbon or silicon or silicon/graphite composite or silicon/carbon composite. One type of lithium batteries includes lithium-ion batteries, which are rechargeable, have a relatively high energy density and specific power, and are relatively light.

A major challenge in lithium-ion battery development is the limitation on battery operation over a wide temperature range, such as −40° C. to +85° C. In addition to this, reduced flammability electrolytes have had negative impacts on the performance of lithium-ion batteries. The combination of reduced flammable electrolyte and wide temperature Li-Ion battery operation remains challenging.

Lithium-ion batteries generally include an anode containing at least one of graphite, synthetic graphite, hard carbon, coke, carbon, silicon, silicon based composites such as silicon-graphite composites, silicon-carbon composites and silicon-graphene composites, an electrolyte, a porous separator, and an active cathode material including at least one of $LiCo_yO_2$ (LCO), $LiNi_xCo_yMn_zO_2$ (NCM), $LiNi_xCo_yAl_zO_2$ (NCA), $LiNi_xMn_zO_2$ (NMO), and $LiFePO_4$ (LFP), $LiMn_2O_4$ and combination thereof. In a charge operation of the battery, the $Li^+$ ion migrates to the graphite anode and lithiates the C and forms $LiC_x$. During discharge operation of the battery, the lithium strips from the anode surface back to the cathode structure and releases energy.

The safety of conventional lithium batteries poses a major challenge due to the flammable nature of solvents employed in the electrolyte. Attempts have been made to reduce the flammability of conventional electrolytes in lithium batteries. However, the use of fire-reducing components in the electrolyte generally results in poor performance including rate capability, capacity and cycle life degradation of the battery.

SUMMARY

This summary is provided to introduce a selection of concepts that are further described below in the detailed description. This summary is not intended to identify key or essential features of the claimed subject matter, nor is it intended to be construed as being limited to the embodiments described herein.

Embodiments described herein provide for safer battery development across a wide operational temperature range. In rechargeable battery systems in particular, safety poses a critical consideration. The development of safe lithium batteries therefore requires continued improvements in cell thermal stability as well as the cell designs. Embodiments relate to the implementation of complimentary approaches which work together to enhance a lithium battery system including: (1) addition of fire-retardant additive and SEI formation additive to improve the thermal stability and the electrolyte operational temperature; (2) inclusion of a Carbon Nanotube (CNT) material in the electrode formulation to promote the thermal conductivity of the electrodes (cathode and/or anode); (3) configuration of a cell with a vent design allowing the safe release of pressure that may build up during abnormal operations, such as high temperature, overcharge, or overdischarge.

A battery or electrochemical cell according to the present disclosure may comprise an anode comprising graphite/carbon, an electrolyte comprising a fire-retardant additive, and a cathode comprising a cathode active material. The fire-retardant additive may be one or more member selected from the group consisting of phosphazene, phosphate, phosphonate, phosphite such as triphenyl phosphate, tributyl phosphate, triethyl phosphate, bis(2,2,2,-trifluoroethyl) methyl phosphonate, tris (2,2,2,-trifluoroethyl)phosphate, triphenylphosphite, diethylphosphonate, and diethyl ethylphosphonate.

In some embodiments, the electrolyte may comprise a solid electrolyte interface (SEI) additive selected from the group consisting of vinylene carbonate, 4-fluorophenyl isocyanate, 2,5-dihydrofuran, mono-fluoroethylene carbonate, propylene sulfate, and vinylethylene carbonate. In some embodiments, the electrolyte may also comprise one or more organic solvents selected from the group consisting of ethylene carbonate, propylene carbonate, ethyl methyl carbonate, dimethyl carbonate, diethyl carbonate, methyl propyl carbonate, ethyl acetate, methyl acetate, propylene acetate, butyl acetate, methyl butyrate, ethyl butyrate, dioxolane, 1,2-dimethoxyethane, tetrahydrofuran, diglyme, triglyme, tetraglyme, acetonitrile, dimethyl sulfoxide, dimethyl acetamide, gamma-butyrolactone, and N-methyl-pyrrolidinone. In some embodiments, the electrolyte may further comprise a salt additive selected from the group consisting of lithium hexafluorophosphate, lithium tetrafluoroborate, lithium bis (oxalate) borate, lithium difluoro (oxalate) borate, lithium hexafluoroarsenate, lithium perchlorate, and lithium trifluoromethanesulfonate.

The cathode material may comprise conductive material. Specifically, the conductive material may comprise an electron conducting compound having at least one of a conjugated carbon-carbon double bond, a carbon-nitrogen double bond and carbon-oxygen bond. In certain embodiments, the conductive material may be selected from the group consisting of carbon black, synthetic graphite, graphite nanosheets, graphite nanoplatelets, graphene sheets, non-synthetic graphite, carbon nanofibers, graphitized carbon nanofibers, and carbon nanotubes.

A non-aqueous lithium-ion battery or electrochemical cell according to certain embodiments may comprise an anode including an anode active material, a cathode including a cathode active material comprising a conductive material; a separator disposed between the anode and the cathode, and a non-aqueous electrolyte which is in fluid communication with the anode, the cathode and the separator, wherein the separator and/or non-aqueous electrolyte includes a fire-retardant additive. In certain embodiments, the anode may comprise at least one material selected from the group consisting of graphite, coke, synthetic graphite, hard carbon, carbon, silicon, silicon-alloy, silicon-graphite composite, silicon-graphene composite, and silicon carbon composite.

In embodiments, the fire retardant additive may be one or more member selected from the group consisting of phosphazene, phosphate, phosphonate, and phosphite, such as, e.g., triphenyl phosphate, tributyl phosphate, triethyl phosphate, bis(2,2,2,-trifluoroethyl)methyl phosphonate, tris (2,2,2,-trifluoroethyl)phosphate, triphenylphosphite, diethylphosphonate, and diethyl ethylphosphonate.

The non-aqueous electrolyte according to the present disclosure may comprise from about 1% to about 25% of the fire-retardant additive by weight based on a weight of the non-aqueous electrolyte.

The conductive material of the cathode material may comprise an electron conducting compound having at least one of a conjugated carbon-carbon double bond, a carbon-nitrogen double bond and carbon-oxygen bond. In some embodiments, the conductive material may be one or more member selected from the group consisting of carbon black, graphite, carbon fiber, graphene, carbon nanotube, functionalized graphene, functionalized carbon nanotube, and functionalized carbon materials. In some embodiments, the cathode material of the non-aqueous lithium-ion battery or electrochemical cell may comprise from about 0.1% to about 20% of the conductive material by weight based on a weight of the cathode material.

Also provided are methods of charging a lithium-ion battery or electrochemical cell, comprising supplying electrical energy to the lithium-ion electrochemical cell at a constant current/voltage, monitoring the voltage/current during charging/discharging, and terminating the charge/discharge when the monitored voltage is in the range of about 2.5 volts to about 5.0 volts, wherein the lithium-ion battery or electrochemical cell comprises an anode including an anode material comprising graphite or silicon or silicon based carbon/graphite composite, a cathode including a cathode active material comprising a conductive carbon, a separator disposed between the anode and the cathode, and a non-aqueous electrolyte which is in fluid communication with the anode, the cathode and the separator, wherein the separator and/or non-aqueous electrolyte includes a fire-retardant additive.

Also provided are methods for manufacturing the non-aqueous lithium-ion electrochemical cell according to the present disclosure, comprising preparing a separator including a fire-retardant additive or preparing a non-aqueous electrolyte including a fire-retardant additive, and introducing the separator and/or non-aqueous electrolyte into the lithium-ion electrochemical cell.

In certain embodiments, the non-aqueous lithium-ion electrochemical cell of the present disclosure may be, e.g., a pouch cell that may have a valve opening on a side thereof, or a cylindrical cell, or a prismatic hard case cell.

BRIEF DESCRIPTION OF THE DRAWINGS

The manner in which objectives of the present disclosure and other desirable characteristics may be obtained will become further evident from the following description and attached drawings in which:

FIG. 20A is a schematic drawing of the heat dissipation in a conventional carbon cathode structure, and FIG. 20B is a schematic drawing of the heat dissipation in a CNT cathode structure.

DETAILED DESCRIPTION OF EMBODIMENTS

Figure 1:
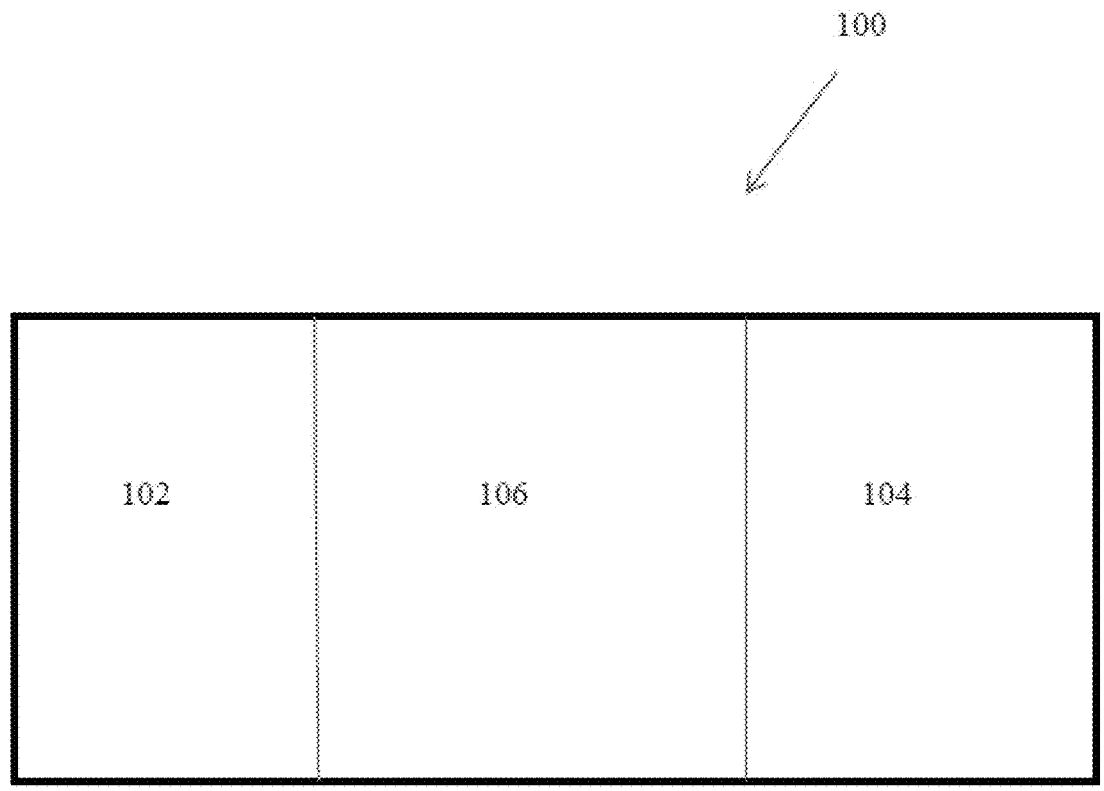
FIG. 1 illustrates a lithium-ion electrochemical cell (or battery) according to certain embodiments.

It should be understood that various principles of the disclosure have been described in illustrative embodiments. However, many combinations and modifications of the above described formulations, proportions, elements, materials, and components used in the practice of the claimed invention, in addition to those not specifically described, may be varied and particularly adapted to specific environments and operating requirements without departing from those principles. Other variations and modifications of the present disclosure will be apparent to those of ordinary skill in the art, and it is the intent that such variations and modifications be covered by this disclosure. Thus, the disclosure herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In addition, the composition used in various embodiments and disclosed herein may also comprise some components other than those cited. In the summary and this detailed description, each numerical value should be read once as modified by the term "about" (unless already expressly so modified), and then read again as not so modified unless otherwise indicated in context. It should also be understood that any range listed or described herein is intended to expressly support any conceivable sub-range within that disclosed range. That is, every point within a disclosed range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the claimed invention. The scope of the claimed invention is accordingly to be limited by nothing other than the claims that may be included in an application that claims the benefit of the present application, in which reference to an element in the singular is not intended to mean "one and only one" unless explicitly so stated, but rather "one or more." Moreover, where a phrase similar to "at least one of A, B, and C" may be used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C.

Furthermore, all structural, chemical, and functional equivalents to the elements of the below-described embodiments that are known to those of ordinary skill in the art are contemplated within the scope of this disclosure.

Definitions

When introducing elements of the present disclosure or the embodiments thereof, the articles "a", "an", "the" and "said" are intended to mean that there are one or more of the elements. The terms "comprising", "including" and "having" are intended to be inclusive and mean that there may be additional elements other than the listed elements.

As used herein, the terms "anode" and "cathode" are used to describe the respective electrodes in a charge/discharge or use operation of the battery or electrochemical cell.

As used herein, the term "battery" may also include current collectors, terminals, and casings, which are not illustrated. Batteries according to embodiments described herein may be of any size or shape, and may comprise one or more electrochemical cells according to the present disclosure.

An "electrochemical cell" may otherwise be referred to herein as a battery, a capacitor, a cell, an electrochemical device, or the like. It should be understood that any cell that involves electron transfer between an electrode and an electrolyte is contemplated to be within the scope of the term "electrochemical cell" as used in the present disclosure. The electrochemical cells according to various embodiments described herein may be made in a variety of sizes and configurations, and in any desirable manner known to those skilled in the art.

The term "charge-discharge efficiency" as used herein, represents the ratio of capacity obtained on discharge divided by the capacity supplied in the prior charge step. In other words, charge-discharge efficiency, $C_{eff}=D_{n+1}/C_n*100\%$, where D is discharge capacity, C is charge capacity and n is the cycle number.

As used herein in reference to performance properties of lithium-ion electrochemical cells or batteries, the terms "improved" or "enhanced" generally refer to an improvement or enhancement in the specific energy, cycle life efficiency, energy density, operating voltage, and/or rate capability of a non-aqueous electrochemical cell, as compared to, e.g., a non-aqueous electrochemical cell that is similarly prepared or designed but lacks a fire-retardant additive as detailed in embodiments herein.

As used herein, "non-aqueous" refers to an electrochemical cell (or battery) that comprises or utilizes organic solvents and inorganic or organic salts as the electrolyte. In embodiments, there is no added water to the electrochemical cell (or batteries) of the present disclosure. That is, water may not be added to the electrolyte as a separate or distinct component thereof. In some embodiments, water may be present as a trace or underlying component or contaminant of the organic solvent(s) used to prepare the electrolyte. For example, in some embodiments, the electrolyte may have a water content of less than about 1000 ppm, or a water content of less than about 250 ppm, or a water content of less than about 5 ppm.

The term "uptake" refers, for example, to an absorption/adsorption process resulting in the association of a flammable component with a surface-functionalized carbonaceous material, such as surface-functionalized carbonaceous material tailored to selectively associate with the functional groups of the flammable component.

Electrolyte Formulation

Embodiments of the invention relate to an improved wide temperature electrolyte formulation having reduced flammability. The improved electrolyte is suitable for use in a battery or electrochemical cell as described herein, and is preferably a non-aqueous, ionically conductive electrolyte that provides a path for migration of ions between the anode and the cathode electrodes during electrochemical reactions of the battery or cell. The electrochemical reaction at the electrodes involves conversions of ions in atomic or molecular forms that migrate between anode and cathode The electrolyte may be in either liquid state or solid state, or both. Preferably, the electrolyte used in embodiments is a liquid non-aqueous electrolyte. In some embodiments, the components of the non-aqueous electrolytes may be substantially chemically inert to the anode and cathode materials. Furthermore, an electrolyte in liquid state may exhibit physical properties that are beneficial for ionic transport (e.g., low viscosity, low surface tension, and/or good wettability).

The various components of the electrolyte may be selected from among those generally known in the art, which are suitable for use in combination with the anode, cathode, and fire-retardant additive materials detailed elsewhere herein. In embodiments, the electrolyte may have an inorganic, ionically conductive salt dissolved in a non-aqueous solvent (or solvent system, when a mixture of solvents is used). The electrolyte may include an ionizable alkali metal salt dissolved in an aprotic organic solvent or a mixture of solvents comprising a low viscosity solvent and a high permittivity solvent. The inorganic, ionically conductive salt may serve as the vehicle for migration of the $Li^+$ ions from anode to cathode and/or cathode-to-anode (for rechargeable systems) active material. $Li^+$ ions behave like a rocking chair during the charge and discharge processes. In embodiments, the ion-forming alkali metal salt may be similar to the lithium comprising the anode.

The electrolyte may include any material suitable for lithium-ion battery operation. In some embodiments, the electrolyte is a non-aqueous solution (e.g., an organic electrolytic solution). In some embodiments, the electrolyte may include one or more non-aqueous solvent and a salt that is at least partially dissolved in the solvent. For example, the solvent may include an organic solvent, such as, e.g., ethylene carbonate (EC) and/or other carbonate based solvents, or butyrate, or acetate, or mixtures thereof. In some embodiments, the solvent may include 1 M $LiPF_6$ dissolved in an aprotic solvent mixture, such as a 1:1 by weight of a mixture of ethylene carbonate and other carbonate based solvents or butyrate or acetate.

Salts suitable for use in various embodiments of the invention include, but are not limited to, $LiPF_6$, $LiSbF_6$, $LiBF_4$, LiTFSI, LiFSI, $LiAlCl_4$, $LiAsF_6$, $LiClO_4$, $LiGaCl_4$, $LiC(SO_2CF_3)_3$, $LiN(CF_3SO_2)_2$, $Li(CF_3SO_3)$, $LiB(C_6H_4O_2)_2$, LiBOB (lithium bis(oxalate) borate), and LiDFOB (lithium difluoro (oxalate) borate).

Low-viscosity solvents (e.g., organic solvents) suitable for use in the electrolyte may include, but are not limited to ethyl methyl carbonate (EMC), dioxlane (DOL), ethyl acetate (EA); propylene acetate (PA); butyl acetate (BA); methyl butyrate (MB); ethyl butyrate (EB); dimethyl carbonate (DMC); diethyl carbonate (DEC); 1,2-dimethoxyethane (DME); tetrahydrofuran (THF); methyl acetate (MA); diglyme (DGL); triglyme; tetraglyme; cyclic carbonates; cyclic esters; cyclic amides; propylene carbonate (PC); methyl propyl carbonate (MPC); acetonitrile; dimethyl sulfoxide (DMS); dimethyl formamide; dimethyl acetamide; gamma-butyrolactone (GBL); and N-methyl-pyrrolidinone (NMP); as well as various mixtures or combinations thereof.

Various types and compositions of the solvent used in the electrolyte, and/or the types and concentrations of a salt present therein, may be selected for use in the battery or electrochemical cell of the present disclosure. For example, in some embodiments, the concentration of the salt in the electrolyte may be in the range of from about 0.5M to about 2.5M, from about 0.75M to about 2.25M, or from about 0.8M to about 2M. In embodiments where a mixed solvent system is employed, the ratio (by volume) may range, for example, from between about 1:9 and about 9:1 of a first solvent (e.g., a carbonate solvent, such as ethylene carbonate) and a second solvent (e.g., ethyl methylene carbonate, diethylene carbonate); that is, the solvent system may comprise from about 10 volume % to about 90 volume %, from about 20 volume % to about 80 volume %, or from about 30 volume % to about 70 volume %, of a first solvent, with all or substantially all of the balance of the solvent system being the second solvent. Additional solvents may also be comprised in the electrolyte mixture.

The electrolyte formulation according to embodiments preferably contains one or more fire-retardant additive(s) selected from fire-retardant compounds that are generally compatible with materials typically used in the manufacture of batteries and electrochemical cells. In embodiments, a fire-retardant additive, as described herein, may be soluble in the electrolyte and may interact with components that are present in lithium-ion batteries or electrochemical cells after the battery is discharged.

For example, suitable fire-retardant compounds may include, but are not limited to, e.g., phosphazene, triphenyl phosphate, tributyl phosphate, triethyl phosphate, bis(2,2,2,-trifluoroethyl)methyl phosphonate, tris(2,2,2,-trifluoroethyl) phosphate, triphenylphosphite, diethylphosphonate, diethyl ethylphosphonate, and mixtures thereof.

The type and concentration of the fire-retardant additive present in the electrochemical cell or battery may be selected in order to improve the physical and/or performance properties of the battery or electrochemical cell of the present disclosure. For example, in one or more embodiments, the concentration of the fire-retardant additive in the electrolyte may be in the range of from about 2% to about 25% by weight based on the total weight of the electrolyte, such as from about 3% to about 15% by weight based on the total weight of the electrolyte, or from about 3% to about 10% by weight based on the total weight of the electrolyte.

In some embodiments, the fire-retardant additive(s) may be used in combination with another compound or salt (such as $LiPF_6$) capable of reducing the flammability of the electrolyte. For example, such compounds may include compounds capable of forming lithium hexafluorophosphate ($LiPF_6$), lithium tetrafluoroborate ($LiBF_4$), lithium bis(oxalate) borate (LiBOB), lithium difluoro (oxalate) borate (LiDFOB), lithium hexafluoroarsenate ($LiAsF_6$), lithium perchlorate ($LiClO_4$), lithium trifluoromethanesulfonate ($LiCF_3SO_3$).

In still further embodiments, the electrolyte formulation preferably also includes one or more additive(s) that stabilize the solid electrolyte interface (SEI). The combination of fire-retardant additive(s) and such "SEI additives," as well as the solvents ratio of the electrolyte formulation, results in enhanced thermal stability of the electrolyte formulation for wide temperature performance without sacrificing the reduced flammability characteristics.

For example, suitable SEI additives may include (but are not limited to) vinylene carbonate (VC), 4-fluorophenyl isocyanate (FPI), 2,5-dihydrofuran (DDF), mono-fluoroethylene carbonate (FEC), propylene sulfate (PS), and vinylethylene carbonate (VEC). Any of the aforementioned solvents may also be used as one or more co-solvents in the electrolyte formulation according to embodiments described herein.

As discussed in more detail in reference to the various examples, Figures, and Table 1 below, the electrolyte formulation according to various embodiments of the invention is suitable for use across a wide temperature of between −40° C. and +85° C., and results in reduced flammability and, thus, a safer lithium-ion battery or cell.

Batteries or Electrochemical Cells

Embodiments of the invention relate to battery or electrochemical cell across a wide temperature range that includes the reduced flammability electrolyte described herein. Batteries according to embodiments may include, e.g., lithium-ion (Li-ion), lithium-sulfur (Li—S), and lithium-carbon monofluoride (Li-CFx). Specifically, provided is battery or electrochemical cell including: an anode comprising graphite or lithium metal or lithium metal alloy; a cathode comprising a cathode material and optionally a fire-retardant additive and/or a separator optionally comprising a fire-retardant additive; and an electrolyte comprising a fire-retardant additive.

In still further embodiments, the invention provides for an improved electrode design with nanocarbon materials, such as carbon nanotube (CNT), across a wide operational temperature range that includes an electrolyte having reduced flammability according to embodiments. In embodiments, the improved electrode design has improved thermal conductivity across a wide temperature range of from −40° C. to +85° C. in order to dissipate heat to overcome internal short-circuiting. Furthermore, a high temperature-stable separator may be included to prevent internal and external short circuiting.

FIG. 1 illustrates a cross-section of a battery (100) in accordance with various embodiments of the present disclosure. The battery (100) includes an anode (102), a cathode (104), an ion conductor (not illustrated), an electrolyte (not illustrated), and optionally a separator (106). In some embodiments, one or more separators, such as two, three, four, or more separators may be used in the batteries and/or cells of the present disclosure.

In embodiments, the anode (102) may comprise lithium as an active material, for example, a lithium metal, lithium ions, and/or one or more lithium-based materials, such as lithium alloys, for example, lithium aluminum alloys, LiAl, LiAlMg, lithium silicon alloys, lithium tin alloys, LiMg, LiSi, LiB and LiSiB. In some embodiments, the anode may further comprise other active anode materials, such as one or more metals selected from the group consisting of magnesium, sodium, and/or potassium. Additional materials suitable for the anode (102) include, but are not limited to, LiC, Li—Sn$_2$O$_3$, Li—Al, Li—Mg and Li—SnO$_2$-based materials. Such materials may be in any suitable form, such as, for example, foils, pressed-powder sheets, or combinations thereof. The anode (102) may also include an embedded current collector.

In other embodiments, the lithium anode (102) may be a lithium based anode. For example, the anode (102) may include lithium, lithium alloy, and/or a lithium-based anode active material.

In preferred embodiments, the anode (102) may comprise as an active material, at least one of graphite, graphene, synthetic graphite, hard carbon, carbon, silicon, silicon-alloy, silicon-graphite, silicon-graphene, silicon-carbon nanotube, silicon-carbon or metal oxide (TiO$_2$) based anode, and may also include one or more fire-retardant additives. In addition, the anode (102) may optionally include a protective separator attached thereto that allows lithium ions to migrate from the anode (102) to an ion conductor and back to anode (102), respectively, during discharging and charging of the battery.

In some embodiments, the anode (102) may include: from about 0.25 wt % to about 20 wt %, or from about 0.5 wt % to about 20 wt %, or from about 1 wt % to about 15 wt %, or from about 2 wt % to about 10 wt %, or from about 3 wt % to about 5 wt % of the conductive material; from about 2 wt % to about 15 wt %, or from about 3 wt % to about 10 wt %, or from about 5 wt % to about 8 wt % of the binder, with the remaining amount being the wt % of the fire-retardant additive.

The (104) may include one or more conventionally known cathode active materials and, in certain embodiments, may include an embedded current collector.

In certain embodiments, the cathode (104) may comprise as an active material at least one of LiCo$_y$O$_2$ (LCO), Li$_a$Ni$_x$Co$_y$Mn$_z$O$_2$ (NCM), Li$_a$Ni$_x$Co$_y$Al$_z$O$_2$ (NCA), Li$_a$Ni$_x$Mn$_z$O$_2$ (NMO), and Li$_a$Fe$_x$P$_y$O$_4$ (LFP), LiMn$_2$O$_4$ (Spinel) or combinations thereof. The cathode (104) may also include an embedded current collector In certain embodiments, the cathode (104) may comprise as an active material at least one of Carbon Mono Fluoride (CF$_x$, where x=0.001 to 2), MnO$_2$, Ag$_x$V$_y$O$_4$ or combinations thereof.

In certain embodiments, the cathode (104) may comprise as an active material, at least one of the elemental Sulfur, Carbon-Sulfur composite, polysulfide, metal sulfide or combinations thereof. The cathode (104) may also include an embedded current collector.

The cathode (104) may also include a binder, an electron conductive additive, and/or one or more fire-retardant additives. In some embodiments, the cathode may additionally include a substrate (such as, e.g., an aluminum substrate), whereby the cathode active material, binder, and electron conductive additives (and optional fire-retardant additives) may form a layer or coating over the substrate.

In some embodiments, the cathode (104) may include an aqueous or organic solvent-based binder, such as a polymeric binder, e.g., polytetrafluoroethylene (PTFE) or polyvinylidene fluoride (PVDF), cellulose (CMC). The cathode (104) may further include a conducting material, such as carbon black, synthetic graphite including expanded graphite, graphite nanosheets, graphite nanoplatelet, graphene sheets, non-synthetic graphite (including natural graphite and coke) and graphitized carbon nano-fibers. In embodiments, the conducting material may be used as a conductive filler in the cathodes and/or as a materials that can be surface-functionalized (such as with amine, and/or amide groups by known methods) to form surface-functionalized carbonaceous materials. In preferred embodiments, the conducting material is a carbon nanotube.

In some embodiments, the cathode (104) may include: from about 0.25 wt % to about 20 wt %, or from about 0.5 wt % to about 20 wt %, or from about 1 wt % to about 15 wt %, or from about 2 wt % to about 10 wt %, or from about 3 wt % to about 5 wt % of the conductive material; from about 2 wt % to about 15 wt %, or from about 3 wt % to about 10 wt %, or from about 5 wt % to about 8 wt % of the binder, with the remaining amount being the wt % of the fire-retardant additive.

In embodiments, a cathode may be prepared with the above-mentioned cathode materials in an average loading amount of from about 1 to 90 mg/cm$^2$, or from 5 to 80 mg/cm$^2$, or from 10 to 50 mg/cm$^2$ of a surface of a substrate onto which the cathode material is loaded.

A. Separator

In certain embodiments, the battery or electrochemical cell may include an anode containing graphite or silicon or graphite-silicon or lithium metal or lithium metal alloy, a cathode containing cathode active material, an electrolyte, and a separator (106), such as, e.g., a ceramic coated separator.

In further embodiments, the invention relates to a lithium-ion battery or lithium-ion electrochemical cell including: an anode comprising graphite; a cathode comprising a cathode material and optionally a fire-retardant additive, and/or a separator; and an electrolyte comprising a fire-retardant additive.

For example, the battery or electrochemical cell of the present disclosure may comprise a separator that is stable in high temperatures. A separator according to embodiments may be selected so as to separate the cathode/anode material from the graphite anode/anode material, such as to prevent internal short circuit conditions. The separator material may be selected to have any desired thickness, such as, e.g., from about 15 microns to about 75 microns, or from about 20 microns to about 40 microns. Suitable separator materials may include or be selected from, for example: porous or nonporous polymer membranes, such as polypropylene (PP), polyethylene (PE), polyamide (e.g., nylon), polyimide (PI), polypropylene sulfide (PPS), polysulfone (PS), polyvinyl chloride (PVC), and combinations thereof, such as, e.g., a trilayer membrane of polypropylene/polyethylene/polypropylene (PP-PE-PP); polyimide/polypropylene/polyimide; polyimide/polyethylene/polyimide; polyimide/polyvinylidine fluoride/polyimide and fabrics woven from fluoropolymeric fibers, including, e.g., polyvinylidine fluoride (PVDF), polyvinylidine fluoride-cohydrofluoropropylene (PVDF-HFP), tetrafluoroethylene-ethylene copolymer (PETFE), chlorotrifluoroethylene-ethylene copolymer, and combinations thereof. Fabrics woven from these fluoropolymeric fibers may be used either alone or laminated a microporous film (e.g., a fluoropolymeric microporous film).

In some embodiments, separator may include a fire-retardant additive and/or an inorganic additive (optionally in addition to the fire-retardant additive.

For example, suitable fire-retardant compounds may include (but are not limited to) phosphazene, phosphate, phosphonate, phosphite such as triphenyl phosphate, tributyl phosphate, triethyl phosphate, bis(2,2,2,-trifluoroethyl) methyl phosphonate, tris(2,2,2,-trifluoroethyl)phosphate, triphenylphosphite, diethylphosphonate, diethyl ethylphosphonate, and mixtures thereof.

B. Configuration of Battery or Cell

Figure 2:
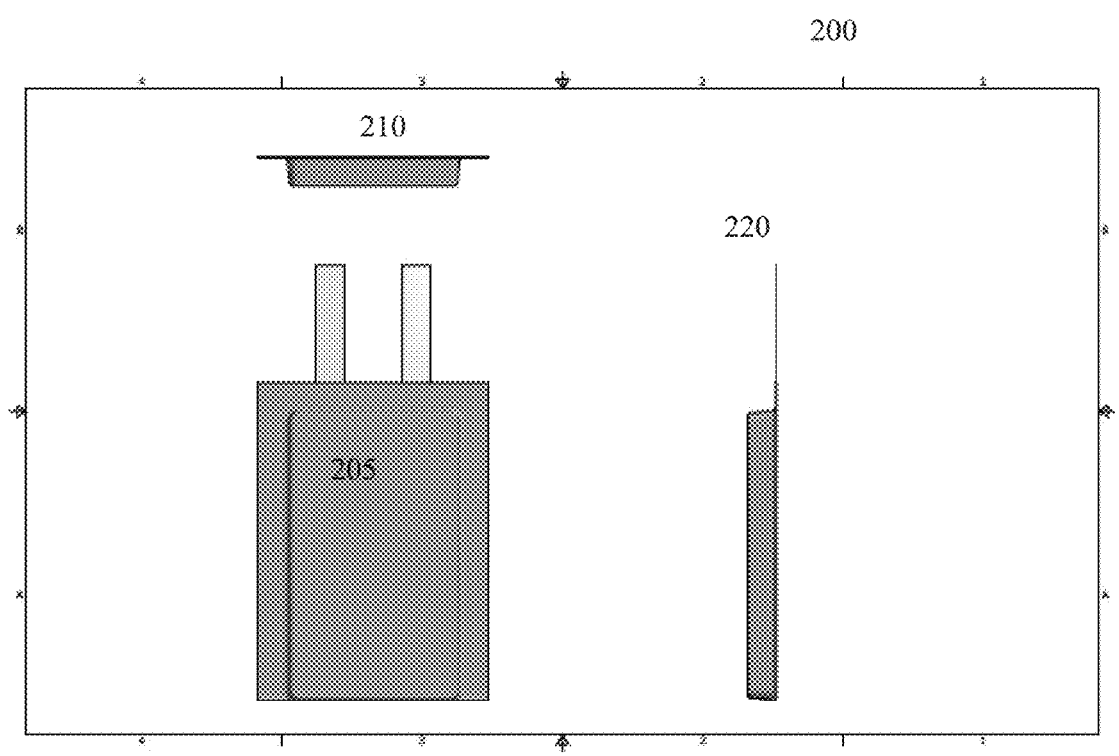
FIG. 2 illustrates a pouch cell according to embodiments.

A form or configuration of the battery or electrochemical cell according to the present disclosure may generally be selected from those known in the art. For example, the form or configuration of the electrochemical cell may be a soft case cell (e.g., a pouch cell) see FIG. 2 or a hard case cell, such as a cell having any conventionally known shape and/or design (e.g., a cylindrical cell), wherein the cathode/anode/separator/electrolyte components are enclosed in a soft cell (e.g., polymer coated flexible aluminum) or a hard cell (stainless steel, nickel, titanium, aluminum with polymeric insulation layer) inside the case material. The casing header may comprise a metallic lid having a sufficient number of openings to accommodate the glass-to-metal seal/terminal pin feed through for the anode and cathode electrodes. An additional opening may be provided for electrolyte filling. The casing header may comprise elements that are compatible with the other components of the electrochemical cell and is resistant to corrosion. The cell may thereafter be filled with the electrolyte solution described hereinabove and hermetically sealed, such as by welding a stainless steel plug over the fill hole. The header or cell case may have a valve or rapture disc as a vent for safe operation/pressure release.

For example, an electrochemical cell according to embodiments described herein may be a lithium-ion battery, comprising: an anode including at least one graphite-based anode active material; a cathode including at least one cathode active material; a separator interposed between the cathode and the anode to separate the cathode and the anode from each other; and an organic electrolyte solution comprising a lithium salt and an organic solvent, wherein the organic electrolyte solution and optionally include a fire-retardant additive as described herein.

Additionally, such a battery or electrochemical cell that includes the fire-retardant additive is generally suitable for a number of known applications or devices, including for example: medical devices (such as pace makers, defibrillators, cardiac monitors, drug delivery systems, pain management systems, etc.), portable military electronic devices (such as radios, transponders, weapon sights, etc.), marine devices (such as sonobuoys, torpedoes, etc.), aerospace devices (such as aircraft, deep space probes, command destruct systems, back-up power systems, etc), military and commercial sensors, remote data collection systems, among other known applications and devices. Likewise, the lithium-ion batteries (and components thereof) of the present disclosure can be used in a variety of applications in which secondary batteries are used, such as, for example, automotive, transportation, personal safety, security, remote monitoring, law enforcement, utilities, metering, military and aerospace applications.

Methods of Forming Battery or Electrochemical Cell

The present disclosure also relates to methods of forming a lithium-ion battery or electrochemical cell by inserting an electrolyte comprising a fire-retardant additive between the anode and the cathode.

In certain embodiments, the methods of the present disclosure include forming an electrochemical cell or battery by inserting a fire-retardant additive material as a sheet between the anode and the cathode in a location other than, or in addition to, the separator. In embodiments, a sheet of the fire-retardant additive material may be inserted between the anode and the cathode, such as between the anode and the separator and/or between the separator and the cathode.

In some embodiments, the methods of the present disclosure include forming a battery by providing an anode comprising lithium; preparing a cathode by providing a substrate; preparing a mixture including a solvent, a binder, and electrically conductive material, such as carbon, to form a slurry; coating the slurry onto the substrate; allowing the solvent to evaporate; and forming a separator including a fire-retardant additive.

In still other embodiments, the methods of the present disclosure include forming a battery by forming a cathode by providing a substrate; preparing a mixture including a solvent, a binder, and electrically conductive material, such as a carbon, to form a slurry; coating the slurry onto the substrate; allowing the solvent to evaporate, and forming a separator, including a fire-retardant additive on at least a portion of the cathode.

Methods of Improving and/or Enhancing Performance Properties

Methods of the present disclosure may include improving or enhancing one or more of the above-mentioned performance properties of a non-aqueous lithium-ion electrochemical cell by using an anode comprising graphite or lithium metal or lithium metal alloy, a cathode comprising a cathode active material, separator, and an electrolyte comprising a fire-retardant additive.

In embodiments, the fire-retardant additive, may be included in one or more of the above components, such as the electrolyte and/or the one or more separator(s), so as to serve to improve the performance of the battery. As a result, the lithium-ion battery (or lithium-ion cell) has a longer service life (such as a service live that is at least 20% longer, or a service live that is in a range of from about 20% longer to about 60% longer, or a service live that is in a range of from about 40% longer to about 50% longer) compared to a conventional lithium-ion battery (or lithium-ion electrochemical cell) that lacks the fire-retardant additive.

In embodiments, the fire-retardant additives may be selected from fire-retardant compounds that are generally compatible with materials typically used in the manufacture of batteries, such as, for example, phosphazene, triphenyl phosphate, tributyl phosphate, triethyl phosphate, bis(2,2,2,-trifluoroethyl)methyl phosphonate, tris(2,2,2,-trifluoroethyl) phosphate, triphenylphosphite, diethylphosphonate, diethyl ethylphosphonate, and mixtures thereof.

The type and concentration of the fire-retardant additive present in the electrochemical cell or battery may be selected in order to optimize one or more physical and/or performance properties of the electrochemical cell (or battery) of the present disclosure. For example, in one or more embodiments, the concentration of the fire-retardant additive in the electrolyte may be in the range of from about 2% to about 25% by weight based on the total weight of the electrolyte, such as from about 3% to about 15% by weight based on the total weight of the electrolyte, or from about 3% to about 10% by weight based on the total weight of the electrolyte.

In some embodiments, the fire-retardant additive may be used in combination with another compound or salt capable of reducing the flammability of the electrolyte. For example, such compounds may include lithium hexafluorophosphate ($LiPF_6$), lithium tetrafluoroborate ($LiBF_4$), lithium bis(oxalate) borate (LiBOB), lithium difluoro (oxalate) borate (LiDFOB), lithium hexafluoroarsenate ($LiAsF_6$), lithium perchlorate ($LiClO_4$), lithium trifluoromethanesulfonate ($LiCF_3SO_3$).

In one method of the present invention, a lithium-ion electrochemical cell is charged/discharged by (a) supplying electric energy at constant current or voltage; (b) monitoring voltage or current during the charging/discharging; and (c) terminating the charge/discharge when the monitored voltage is in the range of about 2.5 volts to about 5.0 volts. In some embodiments, the charge/discharge may be terminated when the monitored voltage is in the range of from about 2.7 volts to about 4.5 volts, or from about 2.9 volts to about 4.2 volts. The supply of constant current/voltage may be provided with suitable accuracy as selected by one skilled in the art. Voltage/current may be monitored in the monitoring step at intervals varying from about 10 seconds to less than about 1 milli or micro second, depending among other things, for example, on the magnitude of the current and the length of charge. In some embodiments, an electrochemical cell may be charged at constant current to a predetermined voltage; charging continued at this voltage until the charge current density falls to a value with suitable accuracy as selected by one skilled in the art.

In some embodiments, voltage may be used to determine the charge cutoff for charge termination, or a delta voltage/delta time (dV/dt) may also be used. For example, as the charging proceeds dV/dt rapidly increases at full charge, and this point of rapid increase can used with appropriate electronics for charge termination. In some embodiments, a lithium-ion electrochemical cell may be charged by (a) supplying electric energy at constant current; (b) monitoring voltage during the charging; (c) calculating the rate of change of voltage with time (dV/dt); and (d) terminating the charge when the value of dV/dt increases by more than 5 times. In some embodiments the charge is terminated when the value of dV/dt increases by more than 10 times.

In embodiments, the combination of the fire-retardant additive and the other materials of the lithium-ion battery may operate to reduce the flammability of the electrolyte.

In embodiments, the interaction action of the fire-retardant additive with the other components in the battery or electrochemical cell attenuates and/or eliminates flammability of the electrolyte in the battery or electrochemical cell, and protects the lithium-ion battery or electrochemical cell from performance degradation via undesired interactions.

Further, the description of various embodiments herein makes reference to the accompanying drawing figures, which show the embodiments by way of illustration and not of limitation. While these embodiments are described in sufficient detail to enable those skilled in the art to practice the claimed invention, it should be understood that other embodiments may be realized and that logical and mechanical changes (e.g., electrolyte compositions, electrochemical cell components and configurations, etc.) may be made without departing from the spirit and scope of the claimed invention.

The following examples describe a process of manufacturing an electrochemical cell according to various embodiments. These are several illustrations among numerous varieties. Therefore, these examples do not in any way limit the content of the present disclosure.

EXAMPLES

1. Reduced Electrolyte Flammability

Figure 3A:
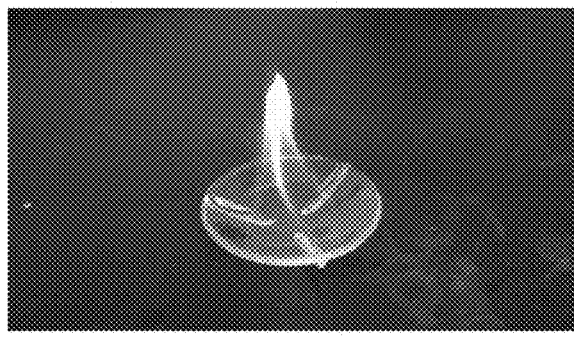
FIG. 3A is an image showing the flammability of a traditional lithium-ion electrolyte.
Figure 3B:
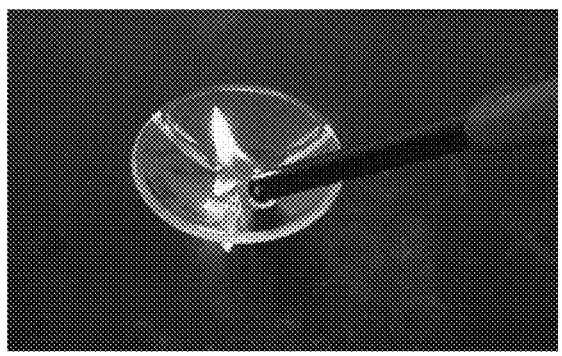
FIGS. 3B and 3C are images showing the non-flammability of an electrolyte containing a fire retardant additive after various attempts as shown in the images, respectively.
Figure 3C:
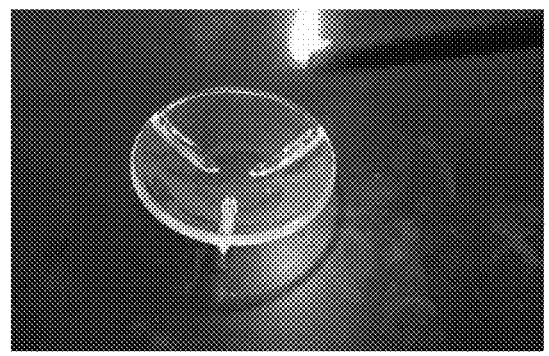

Electrolyte flammability was demonstrated using open flash point measurement. In this method, 2 mL of baseline electrolyte (1M LiPF6 EC/EMC (50:50 by volume)) was taken in a watch glass and lit up by a torch. Upon coming in contact with fire, the baseline electrolyte produced flame instantaneously, and the flame lasted for more than 2 minutes. The same procedure was repeated for the same electrolyte formulation (1M $LiPF_6$ EC/EMC (50:50 by volume)) but containing 3 wt % of fire retardant additive (phoslyte). This electrolyte formulation (within the scope of the invention) did not catch fire, even when ignited for a longer time. The results are depicted by the images in FIG. 3. Specifically, FIG. 3A shows the flammability of a conventional lithium-ion electrolyte, i.e., the baseline electrolyte (1M LiPF6 EC/EMC (50:50 by volume)), whereas FIGS. 3B and 3C show consecutive ignition attempts of the electrolyte containing fire-retardant additive (1M $LiPF_6$ EC/EMC (50:50 by volume)+3 wt % phoslyte).

Further increases of the fire-retardant additive to 5 wt % and 10 wt % demonstrated that the electrolyte still did not catch on fire. It was observed that the effective weight percentage of the fire-retardant additive in the electrolyte formulation is greater than 2 wt %. Table 1 below provides a summary of exemplified electrolyte formulations of a standard lithium-ion electrolyte with varying concentrations of the fire-retardant additive.

TABLE 1

| ELECTROLYTE FORMULATION | OBSERVATION |
|---|---|
| 1M $LiPF_6$ EC/EMC (1:1) by volume | Flame |
| 1M $LiPF_6$ EC/EMC (1:1) by volume + 1 wt % Fire-retardant additive | Flame |
| 1M $LiPF_6$ EC/EMC (1:1) by volume + 2 wt % Fire-retardant additive | Partial Flame |
| 1M $LiPF_6$ EC/EMC (1:1) by volume + 3 wt % Fire-retardant additive | No Flame |
| 1M $LiPF_6$ EC/EMC (1:1) by volume + 5 wt % Fire-retardant additive | No Flame |
| 1M $LiPF_6$ EC/EMC (1:1) by volume + 10 wt % Fire-retardant additive | No Flame |
| 1.2M $LiPF_6$ EC/EMC/DEC (1:1:1) by volume + 8 wt % Fire-retardant additive | No Flame |
| 1.2M $LiPF_6$ EC/EMC/DEC/MB (1:1:1:1) by volume + 10 wt % Fire-retardant additive | No Flame |

An electrolyte vapor pressure flash test was performed in order to understand the flammability of the electrolyte vapor. 2 mL of the baseline electrolyte was placed in an aluminum pan and heated in a heating mantel at 10° C./min. A torch with a flame was placed at a fixed height from the surface of the electrolyte. The mantel was heated until the electrolyte vapor caught fire. In comparing this process for the baseline electrolyte (1M $LiPF_6$ EC/EMC (50:50 by volume) and the baseline electrolyte containing a fire-retardant additive (1M $LiPF_6$ EC/EMC (50:50 by volume)+3 wt % phoslyte), the baseline electrolyte vapor caught fire when the mantel temperature reached about 40° C., whereas the vapor of the electrolyte formulation containing the fire-retardant additive (within the scope of the invention) produced fire at above 80° C. The electrolyte formulation of the present disclosure was not flammable at temperatures below 80° C., thereby being flammable at a temperature almost twice the temperature at which conventional electrolytes produce fire.

2. Thermal Studies by Differential Scanning Calorimeter (DSC)

The thermal stabilities of a lithiated anode and a delithiated cathode with an electrolyte containing a fire-retardant additive in combination with an additive used for "Solid Electrolyte Interface" (i.e., a "SEI Additive"), such as fluorinated ethylene carbonate (FEC), were studied using a differential scanning calorimeter (DSC). The lithium-ion cathode ($Li_xNi_yMn_zO_2$, NCM) and graphite anode lithium-ion cell was assembled in a pouch cell having a configuration that includes a vent on a side wall thereof. Different electrolyte formulations were used to activate the lithium-ion cell. The cell was charged to 4.2V, 100% state of charge (SOC)—state of charge at which the anode is lithiated and the cathode is delithiated. The cell was then opened inside the glove box and the lithiated graphite anode removed from the copper current collector with the electrolyte, and the delithiated cathode was analogously removed from the aluminum current collector.

Figure 4:
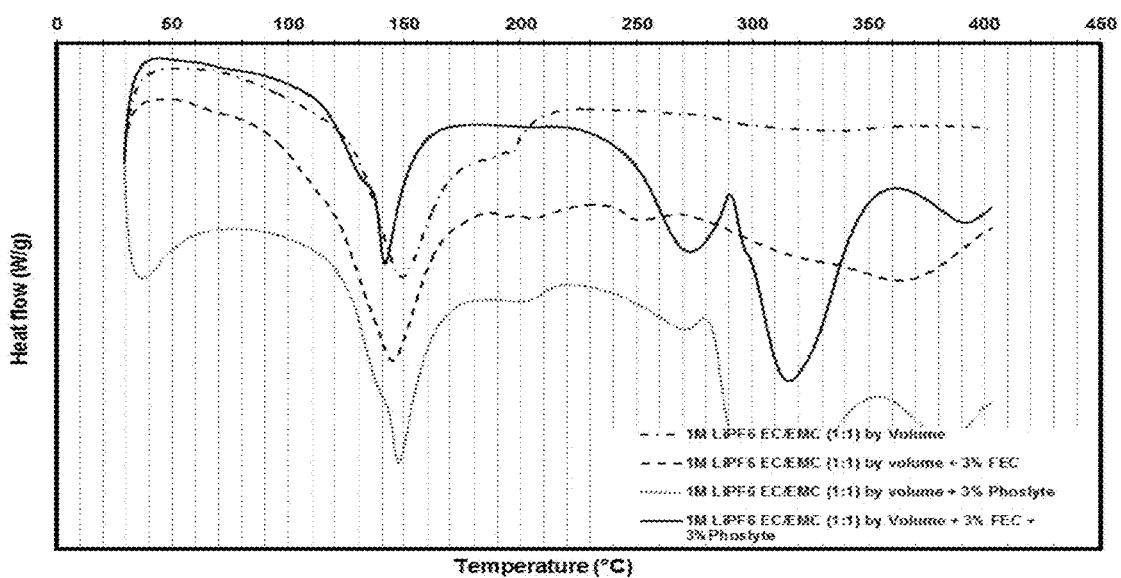
FIG. 4 shows the exothermic reaction temperature of a lithiated graphite anode according to embodiments.

The obtained samples of lithiated graphite anode and delithiated cathode materials were tested for their thermal stability in DSC. About 10 mg of each sample was sealed in a high pressure DSC crucible and then heated at 5° C./min in the DSC equipment. The heat flow was measured and plotted again the temperature. The results are shown in FIG. 4, which shows the exothermic reaction temperature of the lithiated graphite anode. The reduced flammability electrolyte with FEC (1M $LiPF_6$ EC/EMC (1:1 by vol)+3 wt % phoslyte+3 wt % FEC) shows lower energy release as compared to the baseline electrolyte (1M $LiPF_6$ EC/EMC (1:1 by vol), baseline electrolyte+FEC (1M $LiPF_6$ EC/EMC (1:1 by vol)+3 wt % FEC), and even compared to the baseline electrolyte with fire-retardant additive alone (1M $LiPF_6$ EC/EMC (1:1 by vol)+3 wt % phoslyte). This demonstrates the synergistic effect of the fire-retardant additive and SEI additive on improving the thermal stability of the electrolyte.

Figure 5:
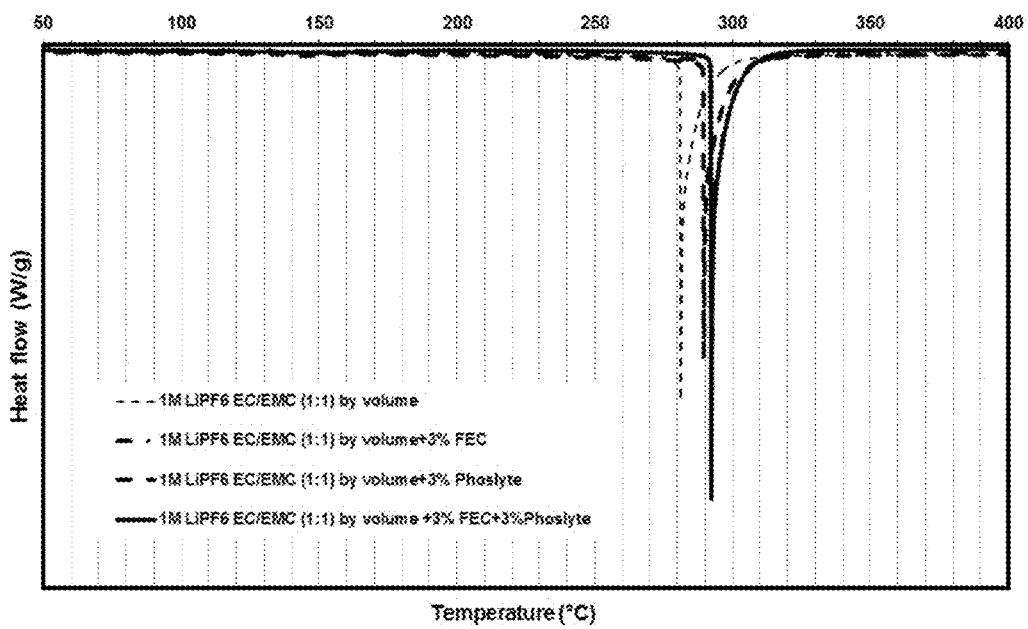
FIG. 5 shows the exothermic reaction temperature of a delithiated NCM cathode.

The delithiated cathode was studied in the same manner using DSC and the results are shown in FIG. 5. These results are consistent with the improved thermal stability of the electrolyte containing a fire-retardant additive and a FEC additive according to embodiments of the invention described herein.

3. Wide Temperature Operation of Lithium-Ion Battery

A major challenge in lithium-ion battery development is the limitation on battery operation over a wide temperature range, such as −40° C. to +85° C. In addition to this, proposed reduced flammability electrolytes have had negative impacts on the performance of such lithium-ion batteries. However, the improved electrolyte formulation claimed herein enables a lithium-ion battery to operate over a wide temperature range of from −40° C. to +85° C. with reduced flammability. Specifically, electrolyte formulations including a fire-retardant additive and a SEI additive (such as, for example, FEC, PS, and VC) according to embodiments of the invention result in improved performance of the lithium-ion battery, both in terms of low temperature rate capability and high temperature stability.

This study was conducted using a test pouch cell having dimension of 52 mm in length and 42 mm in width. A NCM ($LiNi_{0.5}Co_{0.3}Mn_{0.2}O_2$) cathode and a graphite anode were stacked together and separated by a standard tri-layer polymer separator (e.g., celgard 2325). The respective cells were activated using different electrolyte formulations containing a reduced flammable additive (Phoslyte) and a SEI additive (fluoroethylene carbonate (FEC)) mixed in different ratios of carbonated solvents, such as ethylene carbonate, ethylene methylene carbonate, diethylene carbonate, dimethylene carbonate, methyl butyrate and propylene acetate. The cell was then charged and discharged at each test temperature, and kept at that particular test temperature for at least 2 hours to achieve thermal equilibrium to the set temperature. Temperature characterization was performed between −40° C. to +60° C. and then cycled 100 times at 60° C., the temperature was then increased to 71° C. for 4 cycles, then brought down to 60° C. for 30 cycles, and then tested at 85° C. for 4 additional cycles.

Figure 6:
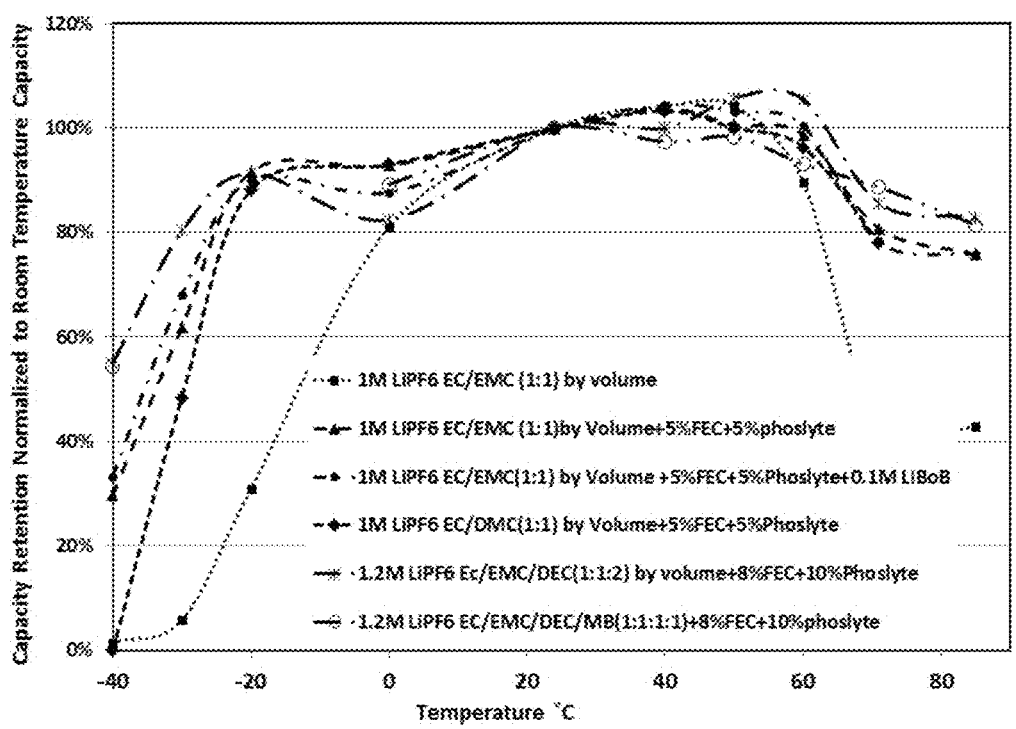
FIG. 6 shows cell performance (temperature stabilities) over a wide temperature range for various electrolyte formulations according to certain embodiments.
Figure 7:
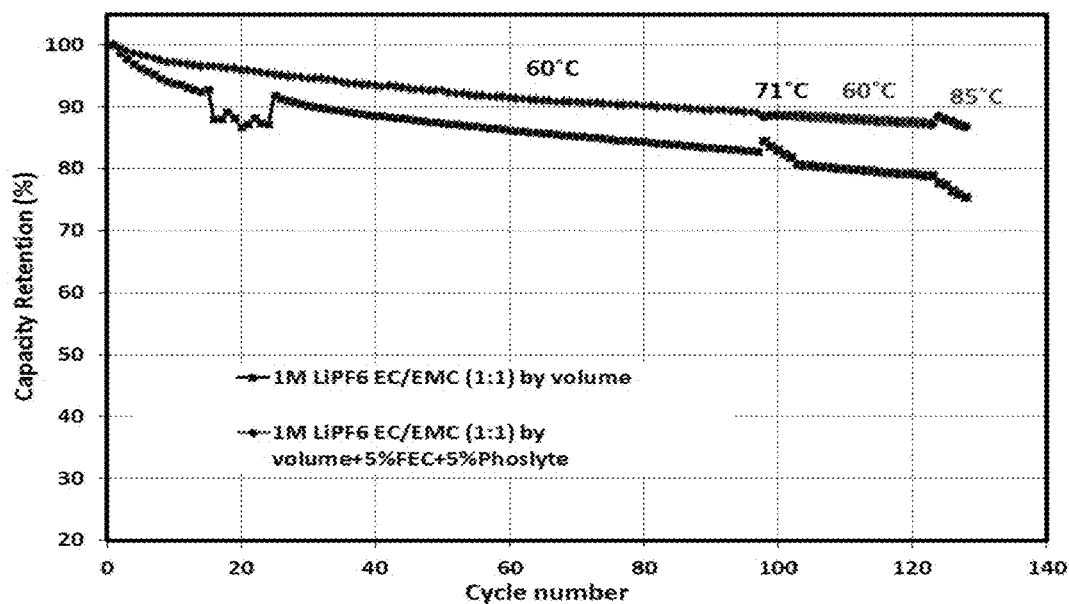
FIG. 7 shows the cell performance (temperature stability) for an electrolyte according to some embodiments, demonstrating high temperature stability at 60° C., 71° C. and 85° C. (discharged at 1C rate).

Exemplified electrolyte formulations demonstrating wide temperature lithium-ion battery operation according to embodiments of the invention are shown in the FIG. 6. Specifically, the reduced flammability electrolyte formulation according to embodiments of the invention demonstrates high temperature stability at 60° C., 71° C. and 85° C. (discharged at 1C rate) are shown in FIG. 7.

Rate capabilities of electrolyte formulations that demonstrated low temperature performance, compared to conventional electrolyte (1M LiPF$_6$ EC/EMC (1:1) by volume), are summarized in Table 2.

TABLE 2

| OPERATION TEMPERATURE (° C.) | TEST RATE | CELL CAPACITY (mAH) | |
|---|---|---|---|
| | | 1M LiPF$_6$ in EC/EMC (1:1) by volume | 1M LiPF$_6$ in EC/EMC/DEC/MB (1:1:1:1) by volume + 8% FEC + 10% Phoslyte |
| −40 | C/20 | 0 | 351.3 |
| −30 | C/2 | 0 | 65.6 |
| | 1C | 0 | 9.84 |
| | 2C | 0 | 0 |
| | 4C | 0 | 0 |
| −20 | C/2 | 11 | 358.9 |
| | 1C | 0 | 116.5 |
| | 2C | 0 | 13.1 |
| | 4C | 0 | 0 |
| −10 | C/2 | 51.3 | 497.4 |
| | 1C | 42.8 | 364.5 |
| | 2C | 28 | 74.5 |
| | 4C | 2.13 | 8.886 |
| 0 | C/2 | 491.3 | 573.6 |
| | 1C | 373.1 | 512.9 |
| | 2C | 97 | 293.2 |
| | 4C | 30.3 | 37.3 |
| 10 | C/2 | 561.5 | 614.2 |
| | 1C | 527.4 | 575.9 |
| | 2C | 401.1 | 455.8 |
| | 4C | 66 | 86.3 |
| 30 | C/2 | 581.3 | 636.3 |
| | 1C | 567.1 | 628.6 |
| | 2C | 537.7 | 598.2 |
| | 4C | 368.1 | 384.1 |
| 50 | C/2 | 581.6 | 643.2 |
| | 1C | 557 | 634.4 |
| | 2C | 518.3 | 616.6 |
| | 4C | 424.3 | 523.4 |
| 60 | C/2 | 557.4 | 614.8 |
| | 1C | 523.7 | 600.9 |
| | 2C | 478.7 | 574 |
| | 4C | 394 | 474.6 |
| 71 | 1C | 495.6 | 572.2 |
| | | 488.3 | 567.2 |
| | | 481.5 | 561.1 |
| | | 476.3 | 551.8 |
| | | 471.5 | 546.4 |
| 85 | 1C | 448.4 | 525.8 |
| | | 444.9 | 533 |
| | | 440 | 526.4 |
| | | 435 | 521.7 |
| | | 430.1 | 514.9 |

The comparative results summarized in Table 2 demonstrate that the reduced flammability electrolyte formulation described herein outperforms conventional electrolyte formulations used in the lithium-ion industry. The results further show the low temperature rate capability performance for various electrolyte formulations containing a fire-retardant additive and a SEI additive in different ratios of the carbonate solvent mixture.

4. Overcharge Test Results

Figure 8:
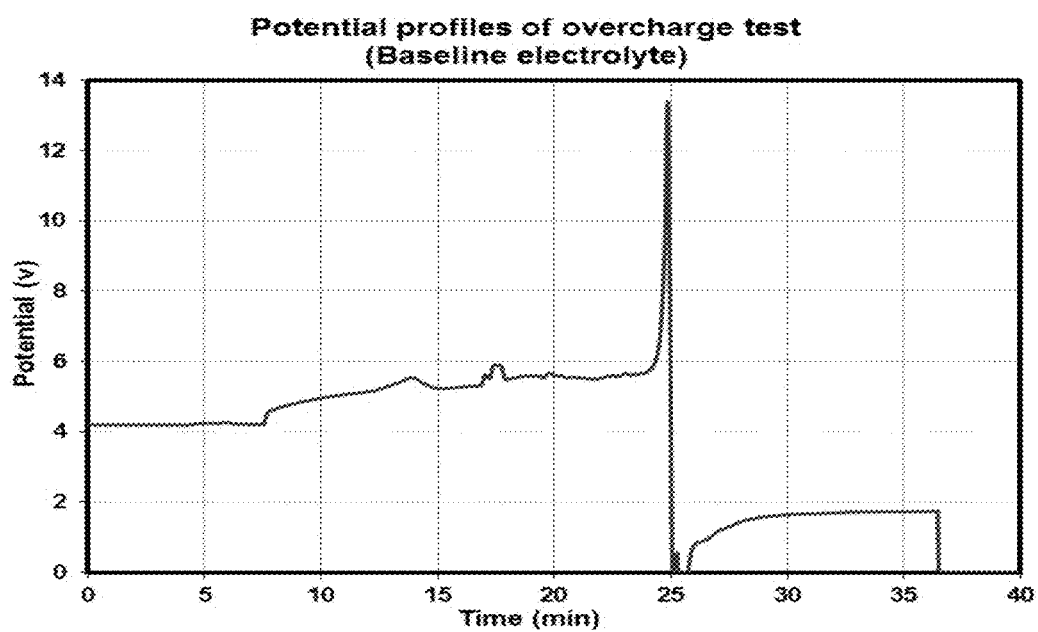
FIG. 8 shows results of an overcharge test (at a 2C overcharge rate) of a pouch cell wherein the baseline cell caught fire.
Figure 9:
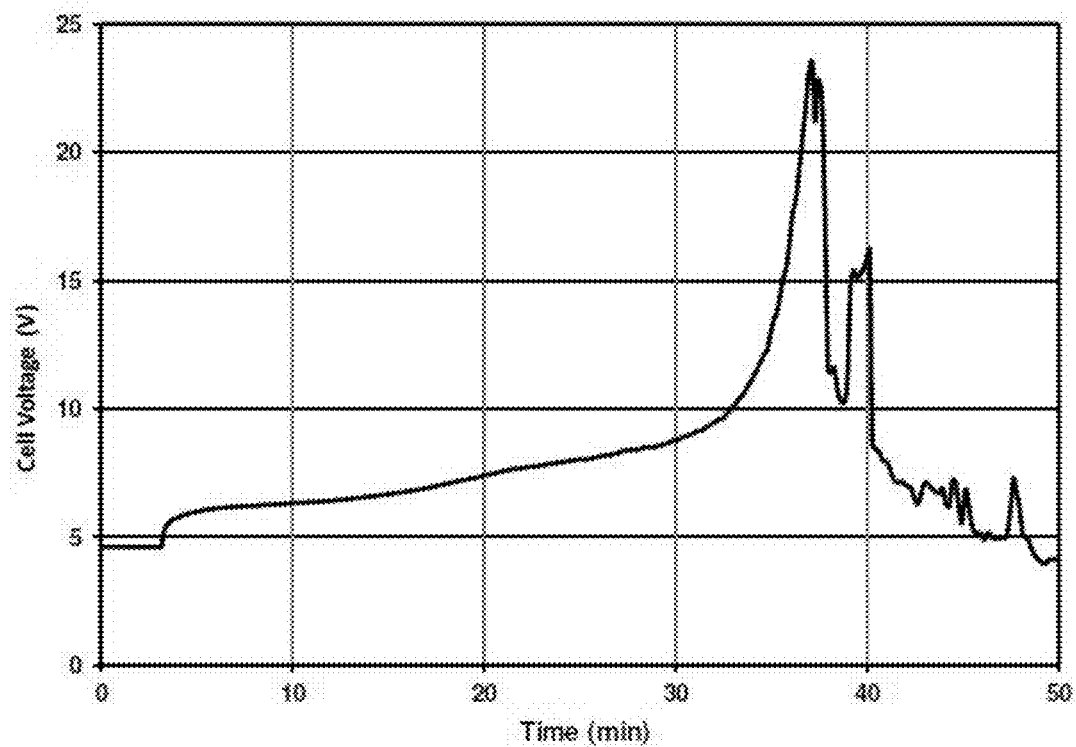
FIG. 9 shows results of an overcharge test (at a 2C overcharge rate) of a lithium-ion cell having a reduced flammability electrolyte according to embodiments, as well as a vent in the pouch design according to embodiments, wherein the electrochemical cells did not catch fire.

Pouch cells with dimension of 52 mm×42 mm×6 mm and 98 mm×68 mm×6 mm were used to conduct the overcharge safety test. The cells were charged to 4.1V-4.3V, which is 100% state of charge (100% SOC) prior to the overcharge safety test. Then, each test cell was charged at a constant current at 1C rate to 12V, and when the cell voltage reached 12V, the voltage was maintained at constant-voltage mode for 2-3 hrs. Notably, the cell according including an electrolyte of 1M LiPF$_6$ EC/EMC (1:1) by volume+5 wt % FEC+5 wt % phoslyte and a vent (according to embodiments of the invention) did not go to thermal runaway, while the baseline cell with 1M LiPF$_6$ EC/EMC (1:1) without a vent caught on fire. The same procedure was followed for another set of cells with a constant charging current at 2C without any voltage being limited in order to set the cell thermal runaway. Again, the cell according to embodiments of the invention (with an electrolyte of 1M LiPF$_6$ EC/EMC (1:1) by volume+5 wt % FEC+5 wt % phoslyte and including a vent) did not catch fire, whereas the baseline cell (with an electrolyte of 1M LiPF$_6$ EC/EMC (1:1) and with or without a vent) caught fire. Results are shown in FIGS. 9 and 8, respectively.

Figure 10A:
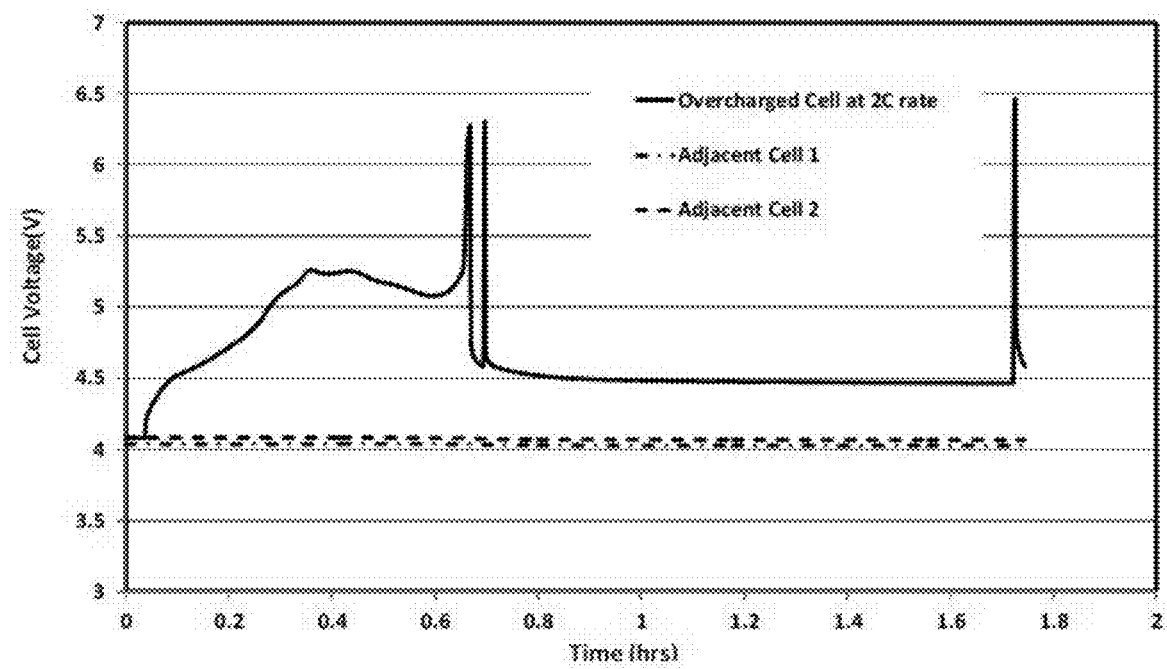
FIG. 10A shows the voltage profile and FIG. 10B shows the temperature profile of three cells in a battery module following an overcharge test (at a 2C overcharge rate on the middle cell).
Figure 10B:
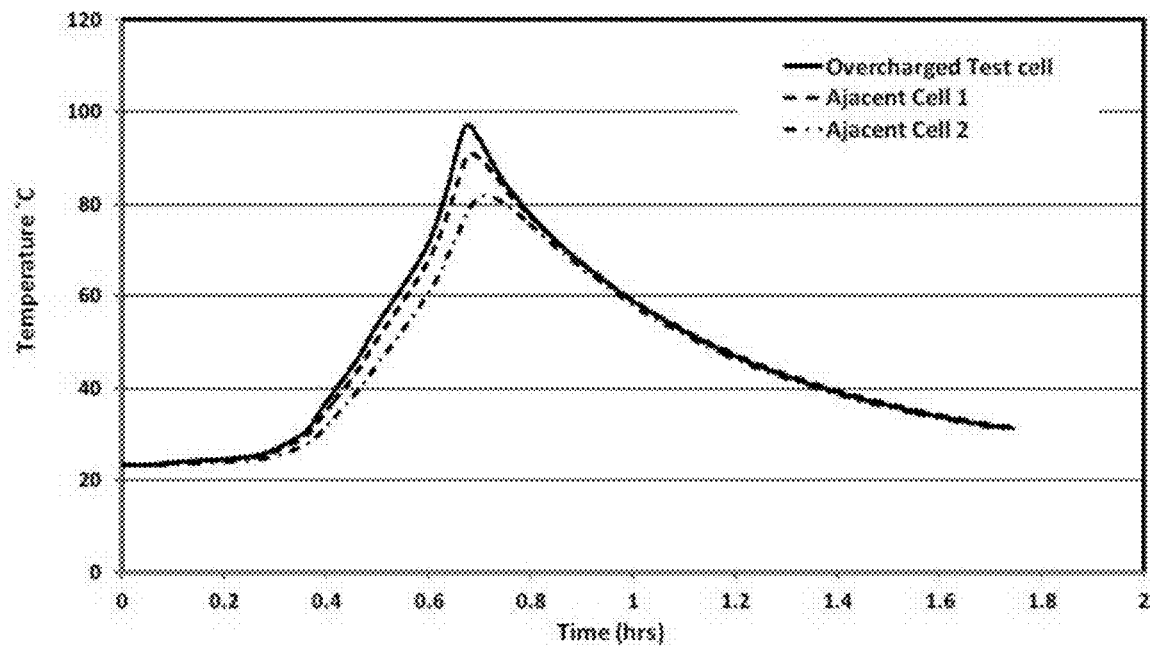

FIGS. 10A and 10B show voltage and temperature profiles, respectively, of an overcharge test at 2C rate of a 3-cell battery module. As shown by the results, the EaglePicher pouch cell described having a vent design, in combination with the reduced flammability electrolyte according to embodiments of the invention, shows no thermal runaway at 1C and 2C rate overcharge.

For the above test, one lithium-ion cell in a 3-cell battery module was tested under overcharge conditions at 2C rate, with the voltage of the two other adjacent cells being measured during the overcharge test. All these three cells were charged to 100% SOC when the middle cell of the pack tested for the overcharge test at 2C rate. As shown in FIGS. 10A and 10B, the middle cell which was overcharged did not result in thermal runaway and never observed fire/flame or smoke. The two other cells were maintained at their 100% state of charge at 4.1V. Although the skin temperature of all three cells reached about 100° C., no fire/flame or smoke was observed during the entire testing period. The improved cell design provides for reduced inside pressure during the overcharge, thereby eliminating higher internal resistance and subsequently decreasing cell internal temperature during decomposition of the electrolyte at high voltage. Notably, in the pouch cell having a vent design and containing the reduced flammability electrolyte according to embodiments of the invention, no thermal runaway was observed at 1C and 2C rate overcharges, and there was again no evidence of fire, flame, or even smoke.

5. Improved Thermal Conductivity of Electrode

Figure 11:
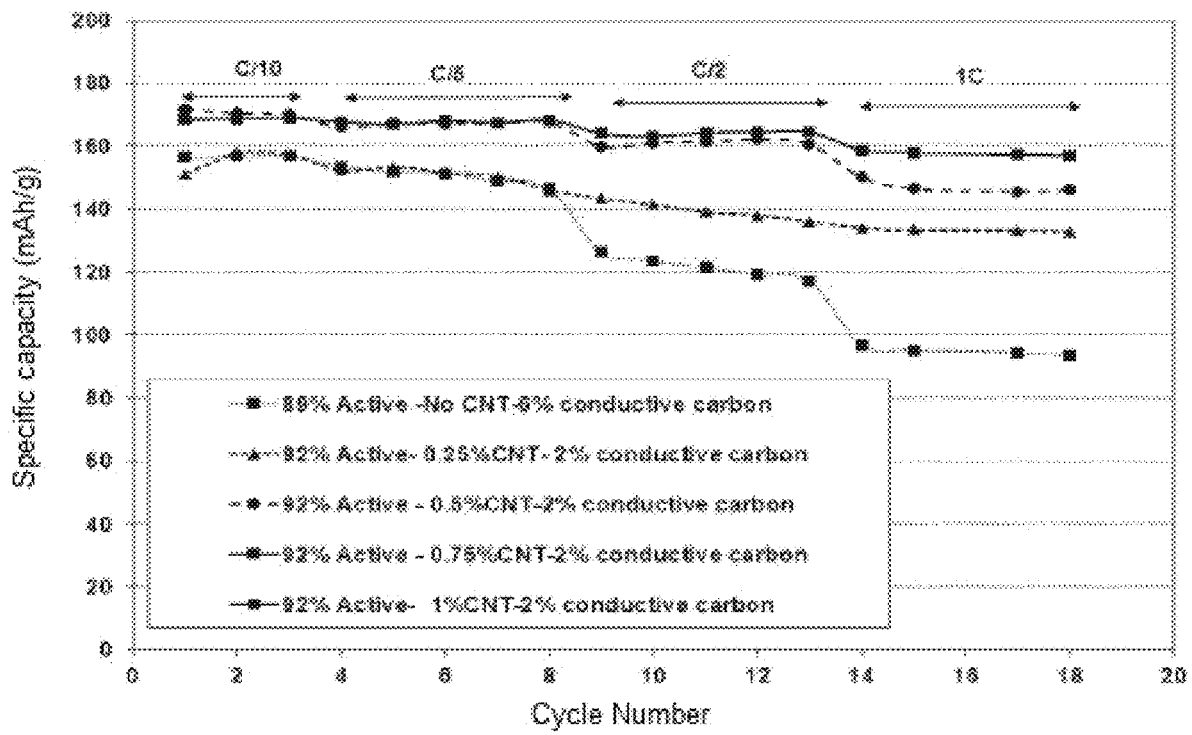
FIG. 11 shows the improved rate capability effect of using CNT as a conductive additive in a LFP cathode according to embodiments.
Figure 12:
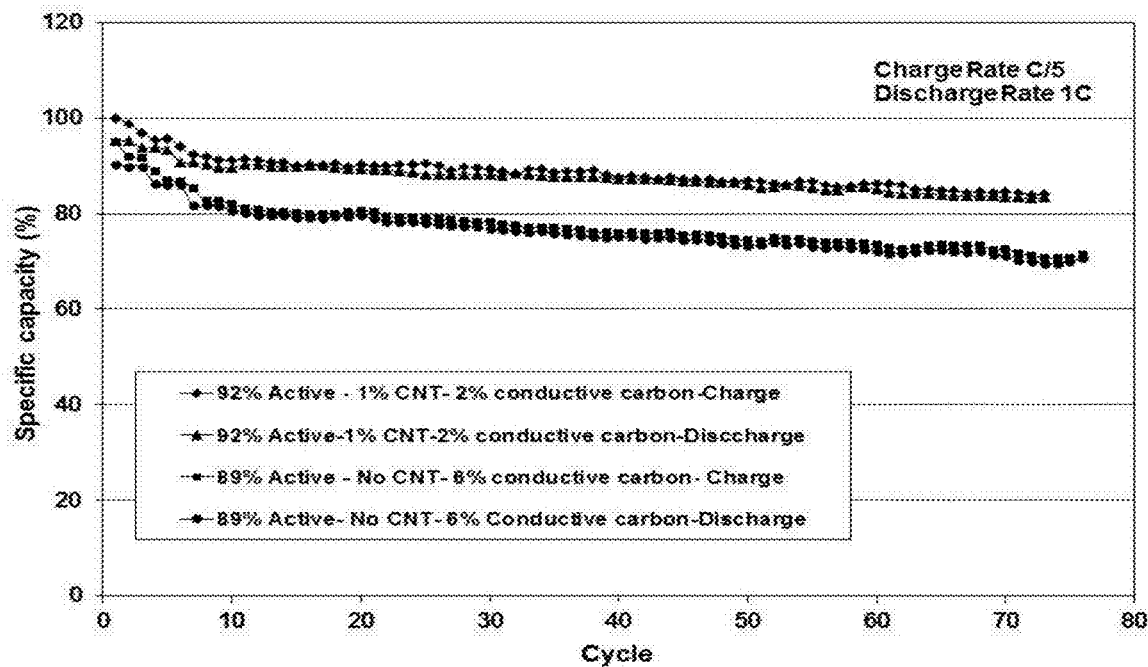
FIG. 12 shows the improved cycle life performance effect of using CNT as a conductive additive in a LFP cathode according to embodiments.

Carbon nanotube (CNT) is known to be a highly electrically and thermally conductive carbon-based material due to its high aspect ratio. The present inventors have demonstrated that using CNT in a cathode according to embodiments exemplified herein results in rate capability and cycle life improvement. High electrical conductivity of CNT provides an opportunity to increase the active material content in cathode which promotes overall energy density of the cathode and subsequently high energy density battery. In this example, LiFePO$_4$ was used as an active material with different concentrations of CNT and conductive carbon, such as carbon black, graphite, etc. CNT-based cathodes containing 92 wt. % of active material with less than 3 wt. % of total carbon, and including various concentration of CNT, were used. For comparison, a conventional cathode containing 89 wt. % active material with 6 wt. % of conductive carbon was used. Both types of cathodes were made with a 5% PVDF binder. The slurry was mixed in a shear mixer at 700 rpm and coated on aluminum foil. Coin cells were assembled in a 2025-type coin cell case with lithium metal as a counter electrode. A tri-layer shut-down separator was used to separate the cathode and the lithium anode. As the electrolyte, an electrolyte of 1M LiPF$_6$ EC/EMC (1:1) by volume was used to activate the cell for the electrochemical tests. As shown in FIGS. 11 and 12, the inclusion of CNT in the cathode structure, even at 0.25 wt. % resulted in a good rate capability and improved cycle life performance of the electrochemical cell. That is, FIG. 11 shows the effect of including CNT as a conductive additive in a LiFePO$_4$ cathode on rate capability, and FIG. 12 shows the effect of including CNT as a conductive additive in a LiFePO$_4$ cathode on cycle life.

Figure 13:
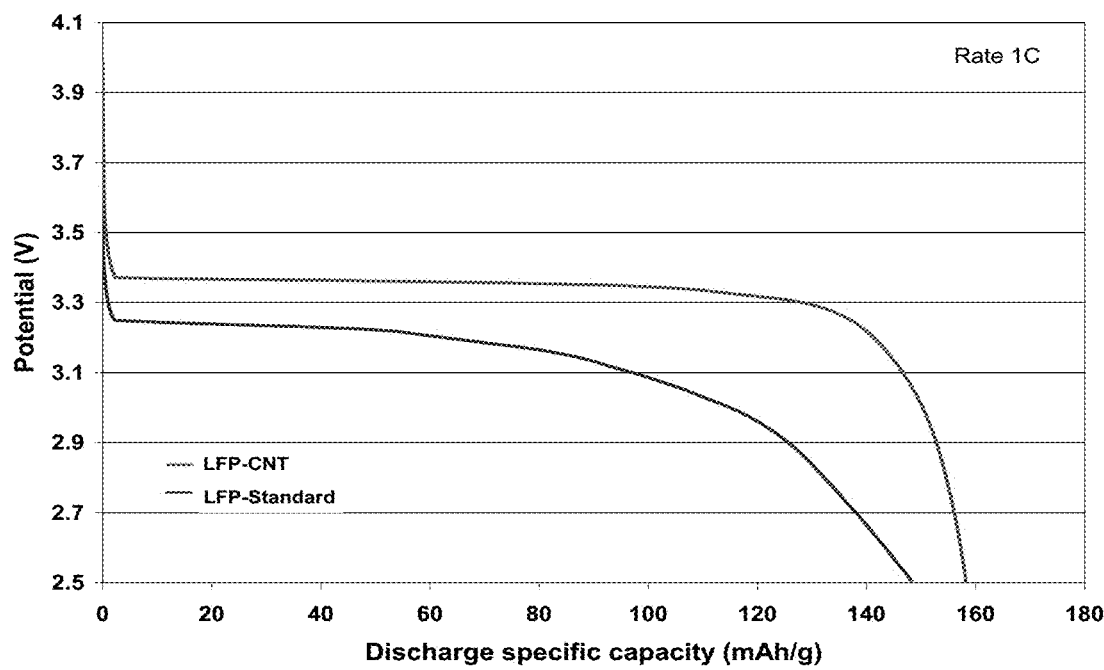
FIG. 13 shows a comparison of the operating voltage (at a 1C rate) between a LFP cathode half-cell with and without CNT.

FIG. 13 provides a comparison of the operating voltages at 1C rate between LFP cathode half-cells with and without CNT. As shown in FIG. 13, in addition to the improved performance of the CNT-based electrode in rate capability and cycle life, the CNT-containing cathodes operate at a higher potential than the conventional (comparative) cathode, as shown in FIG. 13. This result is a significant improvement in the energy density of the lithium-ion electrochemical cell. Furthermore, even though high rate electrode designs typically suffer of capacity loss due to thinner electrodes and lower active mass per unit area, the battery or electrochemical cell according to embodiments does not suffer such capacity loss in high rate applications because, by using CNT in the cathode structure, higher electronic conductivity can be achieved even with a lower conductive carbon concentration. This is yet another unexpected improvement presented by the lithium-ion electrode technology in batteries or electrochemical cells of the present disclosure.

Figure 14:
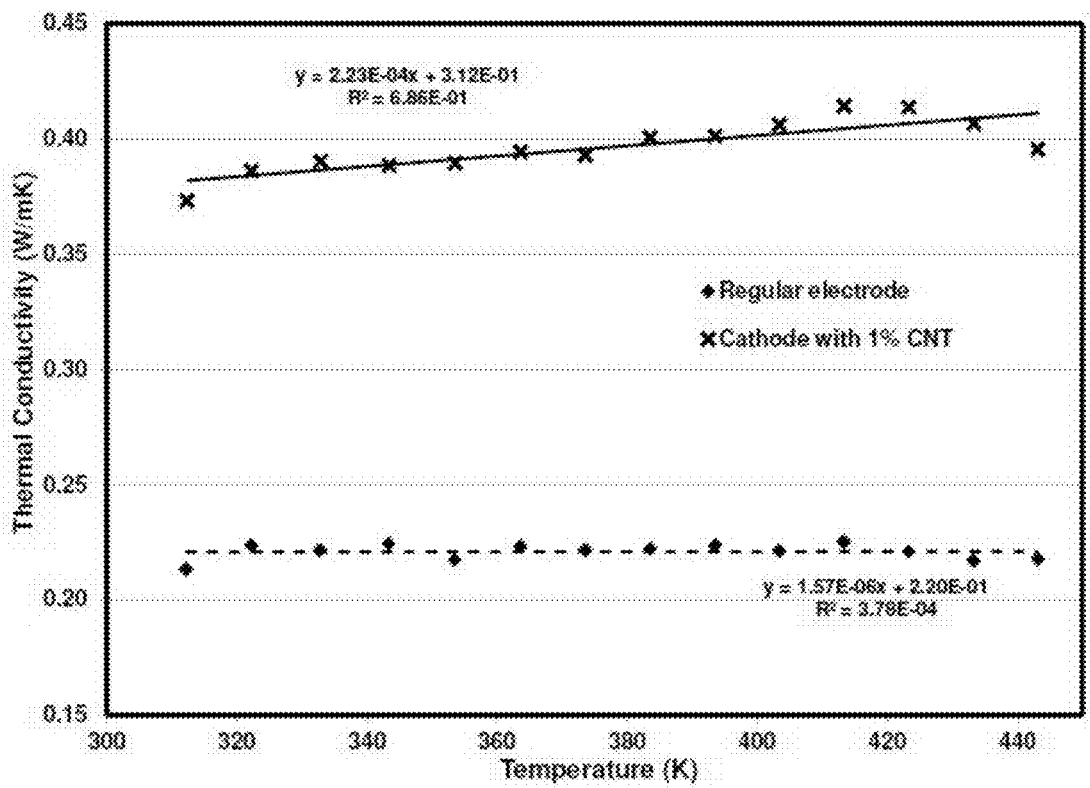
FIG. 14 shows a comparison of the thermal conductivity (measured by laser flash point method) of a LFP electrode with and without CNT.

Use of the improved CNT-based electrode, as described herein, results in a clear benefit in performance as compared to conventional electrodes. The performance improvement is based on the advantage of electronic conductivity of the CNT. In addition to the electronic conductivity, CNT is highly thermally conductive (2000-4000 Wm/K). For example, FIG. 14 shows a 2× (two-fold) increase in thermal conductivity of the CNT-based electrode described herein as compared to the conventional electrode.

Figure 15:
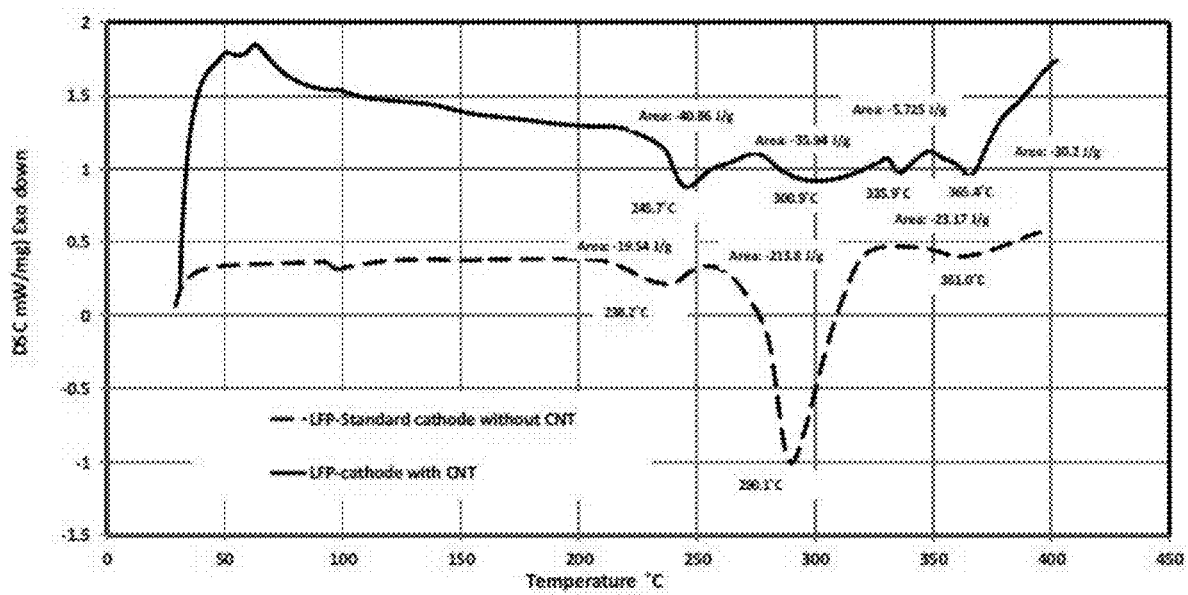
FIG. 15 shows DSC results for a fully charged LFP cathode material in an electrolyte with and without CNT.

Furthermore, FIG. 15 shows the Differential Scanning calorimetric (DSC) results of a LFP electrode that has been fully charged (100% SOC). The heat flow of the fully charged electrode was observed during increasing temperature in a N$_2$ atmosphere to determine the exothermic reaction temperature of electrode materials in the presence of electrolyte. The overall exothermic energy was found to be significantly lower for the LFP-CNT cathode as compared to LFP-standard cathode in the fully charged state. This significant difference is due to the higher thermal conductivity of CNT that reduces or dissipates the heat flow or most of the heat. Therefore, the active materials stay in a slightly cooler environment as compared to a standard LFP cathode where the heat cannot dissipate through the poor conductive network and due to the thermal conductivity of carbon blacks and graphite. These results suggest that there would potentially be some advantage for higher thermal conductivity of the electrode in lithium-ion cells.

The electrode heat dissipation capability and cell temperature were further evaluated in order to better understand the advantages of high thermal conductivity of the electrode in a lithium-ion battery or electrochemical cell. Specifically, thermal conductivity of the LFP electrode with and without CNT was measured by a laser flash point method, and the results provided in FIG. 14. FIG. 15 shows the results of fully charged LFP cathode materials in an electrolyte with and without CNT.

6. Improved Electrochemical Properties of Li—S Battery

Figure 16:
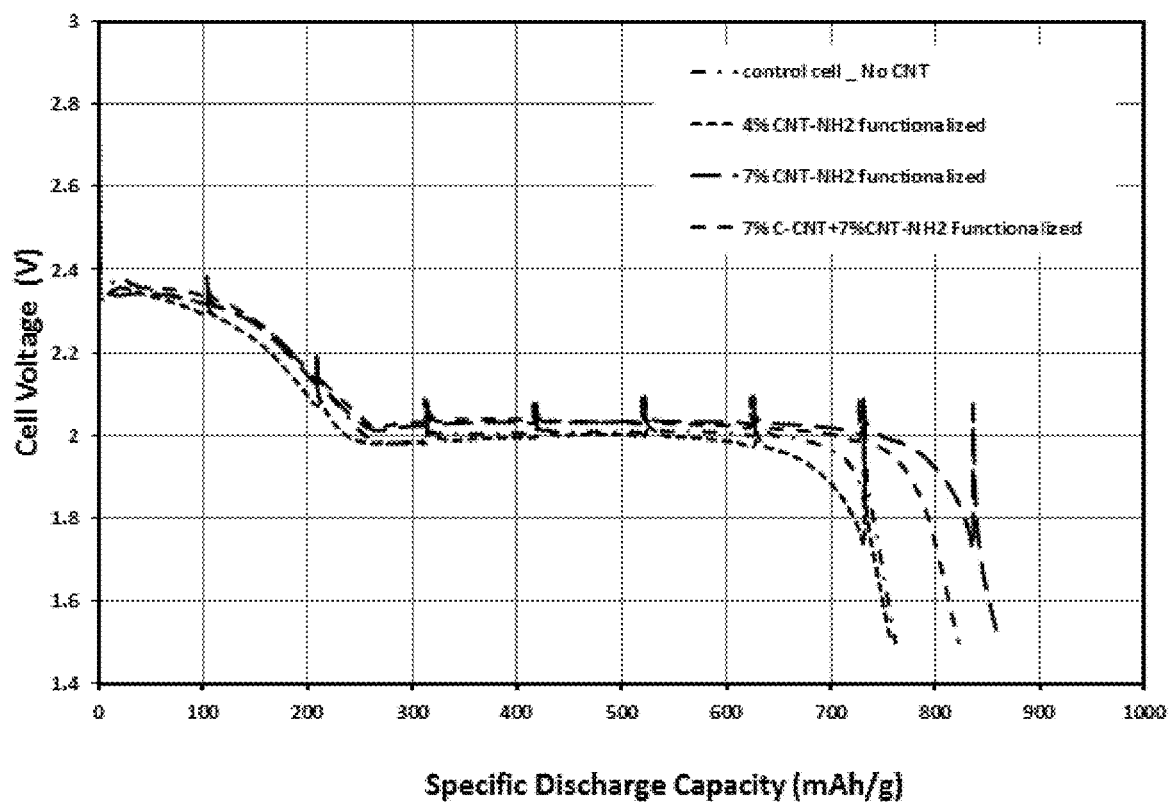
FIG. 16 shows a comparison of the discharge profile for a Li—S pouch cell with and without CNT in the cathode material.
Figure 17:
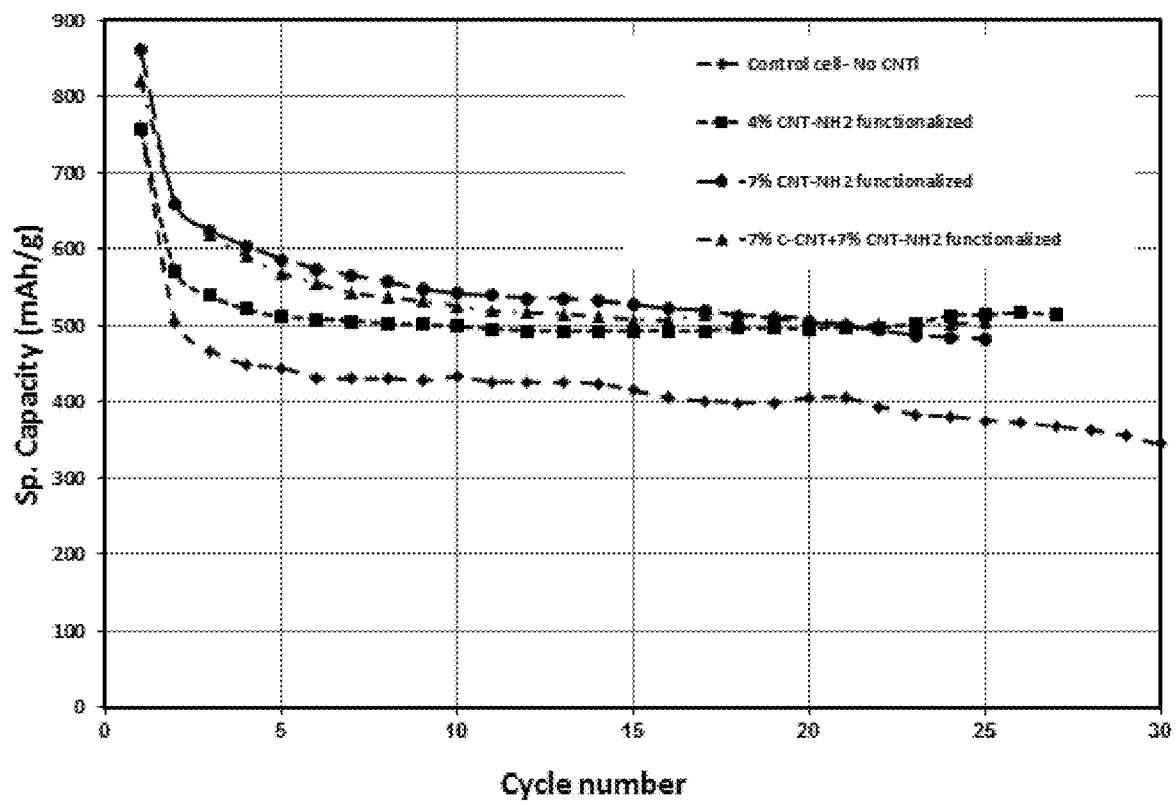
FIG. 17 shows a comparison of the cycle life performance of Li—S Pouch cell with and without CNT in the cathode material.

According to an exemplary embodiment, the cathode may contain elemental sulfur as an active material, as well as conductive carbon, a binder material, and varying concentrations of CNT. A cathode was provided in a pouch cell having a lithium anode and separated by a separator. The pouch cell was activated with organic electrolyte (1M LiTFSi DOL/DGL). The electrochemical properties of the Li—S pouch cell were studied by applying contact current and specific capacity was calculated. The results shown in FIG. 16 show the improvement in specific discharge capacity of a Li—S pouch cell by the addition of functionalized or non-functionalized CNT in the cathode structure. As further shown in FIG. 17, the addition of CNT in the cathode structure also results in improved cycle life performance of a Li—S pouch cell, as compared to a control Li—S pouch cell with no CNT.

7. Use of Carbon Nanotube Material for Improved Safety

An important safety issue associated with lithium-ion batteries is their response to localized heat sources. These can occur if a fault develops between the anode and the cathode (e.g. due to dendrite formation). If the localized temperatures generated by such a fault become sufficient to cause separator degradation, a catastrophic failure of the battery could result. Therefore, for safer lithium-ion development, it is important to remove the localized heat quickly to avoid catastrophic failures. The high thermal conductivity (2000-4000 Wm/K) and high aspect ratio of CNT can form a 3-D thermally conductive network within the electrode structure that can transfer heat quickly out of the localized hot zone to subsequently avoid degradation of the polymer separator (melting temperature around 165° C., but the internal short circuit can increase localized hot spot temperature to 200° C. in seconds) and possibly held reduce the catastrophic failure of the cells.

Preliminary modeling with 3-D finite element calculations for a given heat source resulting from a short circuit between the anode and cathode of a pair located at the center of the cell suggested that heat dissipates quicker for an electrode with CNT than it does for an electrode without CNT. In fact, the thermal conductivity of the electrode with CNT turned out to be 2× (two-fold) higher than of the electrode without CNT. FIG. 18 shows the preliminary modeling results evaluating the effect of thermal conductivity of CNT in the cathode.

Figure 18A:
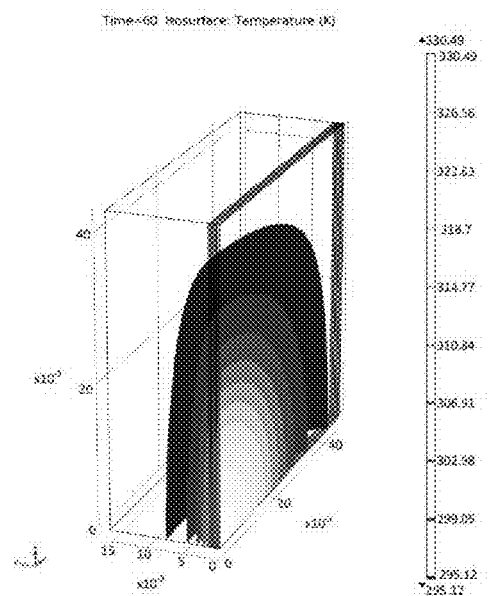
FIG. 18A shows a temperature gradient in the plane of the current collectors near the heat source.

FIG. 18A shows that the temperature gradient is in the plane of the current collector, in which direction heat dissipates through the tab of the current collector. However, the heat has to transfer to the tab from the hot-zone by the composite electrode that includes poor thermally conductive materials, such as binder and cathode active materials. It would therefore take more time to dissipate in the in-plane direction. Therefore, temperature of the out-of-plane surface of the current collector was measured. At the out-of-plane surface, the heat can be dissipated easily (shortened distance to current collector, thickness of the electrode) through the aluminum current collector that is the highest thermally conductive component in the electrode. In this way, the heat can be quickly dissipated from the hot-zone in the region of the internal shorts.

Figure 18B:
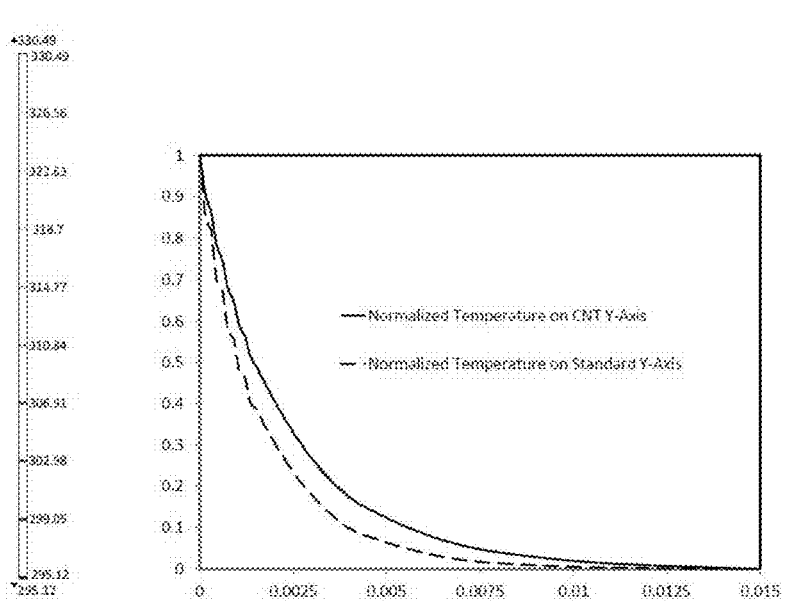
FIG. 18B shows a normalized steady-state temperature in the out-of-plane direction of the current collector.
Figure 18C:
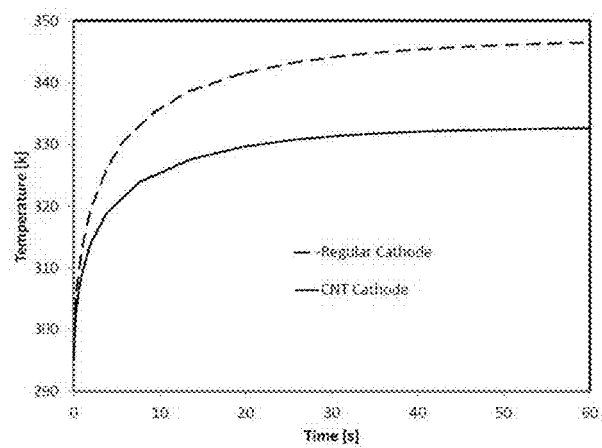
FIG. 18C shows the cell peak temperature versus time for a moderate internal short.
Figure 18D:
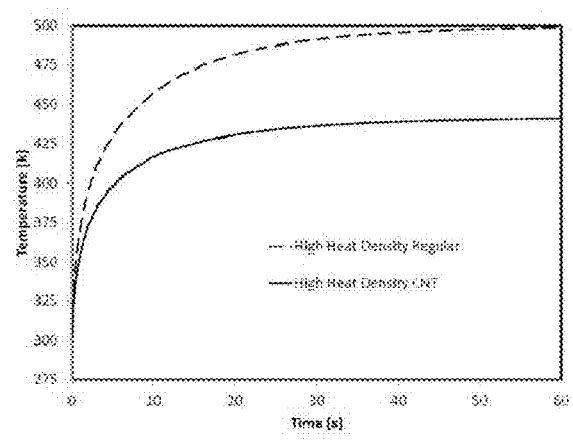
FIG. 18D shows the cell peak temperature versus time for a hard internal short.

An advantage of CNT is that it can form a 3-D conductive network to dissipate heat quicker to the out-of-plane, whereas tradition carbon black and graphite could not establish a 3-D conductive network because they do not have the necessary high aspect ratio. FIG. 18B shows normalized steady state temperature in the out-of-plane surface of the current collector, demonstrating the ability of CNT network to more effectively conduct heat to the current collector. Thus, the current collectors effectively remove more heat from the hot zones. FIGS. 18C and 18D show that the total cell temperature is lower for a CNT-containing cell than for a conventional cell without CNT. This result suggests that CNT participates in dissipating heat quicker than standard carbon blacks and therefore could be used to avoid internal short-circuiting.

Thus, CNT can reduce the internal heat by increasing thermal conductivity and heat dissipation from the surface of the electrode, thereby helping to subsequently reduce the risk of internal short-circuit to some extent.

Figure 19A:
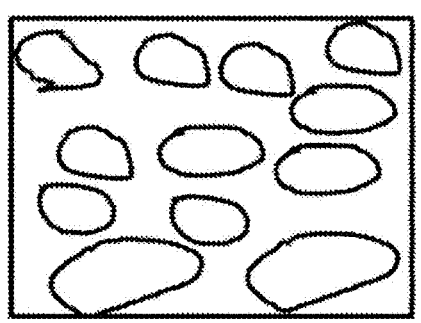
FIG. 19A is a schematic drawing of the conductive network in a conventional carbon cathode structure.
Figure 19B:
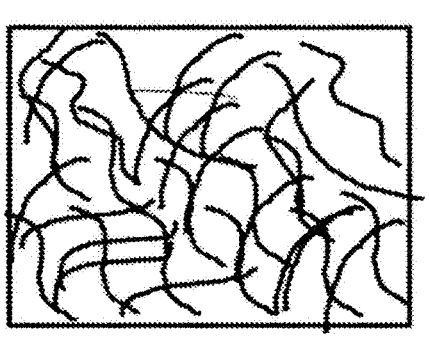
FIG. 19B is a schematic drawing of the conductive network in a carbon nanotube (CNT) cathode structure.

As demonstrated by the schematic diagram of FIGS. 19A and 19B, the cathode structure containing CNT (FIG. 19B) has a different conductive network than a cathode structure containing a conventional carbon (FIG. 19A). Specifically, the schematic diagram in FIG. 19A demonstrates the lower aspect ratio (length-to-thickness ratio) of conventional conductive carbon (e.g., carbon black, graphite, etc.) as compared to carbon nano materials (e.g., CNT, graphene, etc.) shown in FIG. 19B.

Carbon nanomaterials provide electrical percolate at very low concentration, such as at 0.25 wt %. The electrons hop or tunnel across the particle to provide the conductive path. However, as thermal conductivity photons cannot hop between the particles, they instead tunnel through the particles. Therefore, high aspect ratio carbon nanoparticles provide a thermal conductive path by creating a network. In other words, thermal conductivity of the cathode increases with CNT. Referring to FIGS. 20A and 20B, this improves the heat dissipation from the internal short circuit, which creates a "hot-spot" (300) that could be over 200° C., because a carbon nanomaterial (such as, e.g., CNT, graphene, etc.) is able to conduct the heat from the "hot-zone" relatively quickly due to its conductive network established through its high aspect ratio of the CNT, schematic shown in FIG. 20B. As confirmed by the modeling results and demonstrated by the schematic diagram of FIG. 20A, conventional carbon materials could not dissipate heat at a faster rate.

The "hot-spot" developed due to internal short on the electrode can increase the temperature over 200° C., which melts the currently used tri-layer (polypropylene-polyethylene-polypropylene) separator, e.g., CELGARD 2325 in the battery industry. The tri-layer separator melts at around 165° C.-170° C. Therefore, suitable for use in embodiments described herein are high temperature stable separators, such as, e.g., polyimide (PI) or polyphenylene sulfide (PPS), or trilayer separators, such as, e.g., polyimide-polyethylene-polyimide or polyimide-polypropylene-polyimide that will further improve thermal stability to reduce the risk of separator melting.

The combination of high thermal conductivity electrode, high temperature separator, reduce flammable electrolyte and vent design in the cell synergistically improve the overall safety of the lithium-ion batteries or cells described herein.

Although the present invention is set forth herein in the context of the appended drawing figures, it should be appreciated that the invention is not limited to the specific form shown. For example, while the disclosure is conveniently described in connection with particular fire-retardant additives, electrolytes, polymeric materials, and one or more separator, the present disclosure is not so limited. Furthermore, although the battery is described in connection with specific configurations, the invention is not limited to the illustrated examples. Various modifications, variations, and enhancements in the design and arrangement of the method and apparatus set forth herein, may be made without departing from the spirit and scope of the present disclosure as set forth in the appended claims.

Having described the disclosure in detail above, it will be apparent that modifications and variations are possible without departing from the scope of the disclosure defined in the appended claims.

What is claimed is:

1. A lithium-ion battery, comprising:
an anode;
an electrolyte comprising
a total of 3% to 10% by weight of a fire-retardant additive based on a weight of the electrolyte,
3% to 8% by weight of a solid electrolyte interface additive based on the weight of the electrolyte,
a lithium salt, and
an organic solvent, wherein the organic solvent consists of
ethylene carbonate and ethyl methyl carbonate,
ethylene carbonate, ethyl methyl carbonate, and diethyl carbonate, or
ethylene carbonate, ethyl methyl carbonate, diethyl carbonate, and methyl butyrate;
a separator comprising the fire-retardant additive; and
a cathode comprising a cathode material;
wherein the solid electrolyte interface additive is monofluoroethylene carbonate, and
wherein the fire retardant additive is ethoxy(pentafluoro) cyclotriphosphazene.

2. The lithium-ion battery of claim 1, wherein the electrolyte is a non-aqueous liquid electrolyte, and the fire-retardant additive is soluble in the electrolyte.

3. The lithium-ion battery of claim 1, wherein the electrolyte comprises a lithium salt selected from the group consisting of lithium hexafluorophosphate, lithium tetrafluoroborate, lithium bis (oxalate) borate, lithium difluoro (oxalate) borate, lithium hexafluoroarsenate, lithium perchlorate, and lithium trifluoromethanesulfonate.

4. The lithium-ion battery of claim 1, wherein the cathode material comprises a conductive material selected from the group consisting of carbon black, synthetic graphite, graphite nanosheets, graphite nanoplatelets, graphene sheets, non-synthetic graphite, carbon nanofibers, graphitized carbon nanofibers, and carbon nanotubes.

5. The lithium-ion battery of claim 1, wherein the anode comprises at least one material selected from the group consisting of graphite, coke, synthetic graphite, hard carbon, carbon, silicon, silicon alloy, silicon-graphite composite, silicon-graphene composite, and silicon carbon composite.

6. A method of charging the lithium-ion battery of claim 1, the method comprising:
supplying electrical energy to the lithium-ion electrochemical battery at a constant current;
monitoring the voltage during charging; and
terminating the charge/discharge when the monitored voltage is in the range of about 2.5 volts to about 5.0 volts.

7. The method of claim 6, wherein the electrolyte includes the fire retardant additive in combination with one or more lithium salts.

8. The method of claim 6, wherein the non-aqueous electrolyte further comprises a salt that is at least one member selected from the group consisting of $LiPF_6$, $LiAsF_6$, LiTFSI, LiFSI, $LiSbF_6$, $LiBF_4$, $LiClO_4$, $LiAlCl_4$, $LiGaCl_4$, $LiC(SO_2CF_3)_3$, $LiB(C_6H_4O_2)_2$, $LiN(CF_3SO_2)_2$ and $Li(CF_3SO_3)$, LiBOB, and LiDFOB.

9. The method of claim 6, wherein the separator comprises from about 0.001% to about 90% of the fire-retardant additive by weight based on a weight of the non-aqueous electrolyte.

10. The lithium-ion battery of claim 2, wherein the separator comprises a ceramic coated separator, and wherein the fire-retardant additive in the electrolyte is same as the fire-retardant additive in the ceramic coated separator.

11. The lithium-ion battery of claim 1, wherein the organic solvent consists of ethylene carbonate and ethyl methyl carbonate in a volume ratio of 1:1.

12. The lithium-ion battery of claim 1, wherein the organic solvent consists of ethylene carbonate, ethyl methyl carbonate, in a volume ratio of 1:1:1 or 1:1:2.

13. The lithium-ion battery of claim 1, wherein the organic solvent consists of ethylene carbonate, ethyl methyl carbonate, diethyl carbonate, and methyl butyrate, in a volume ratio of 1:1:1:1.

14. The lithium-ion battery of claim 13, wherein the lithium-ion battery operates at a temperature from −40° C. to 85° C. at a rate of 1C.

\* \* \* \* \*